United States Patent
Suntych

(12) 
(10) Patent No.: US 9,844,209 B1
(45) Date of Patent: Dec. 19, 2017

(54) PHOTON MODULATION MANAGEMENT SYSTEM FOR STIMULATION OF A DESIRED RESPONSE IN BIRDS

(71) Applicant: Jon Daren Suntych, Greeley, CO (US)

(72) Inventor: Jon Daren Suntych, Greeley, CO (US)

(73) Assignee: Xiant Technologies, Inc., Greeley, CO (US)

( * ) Notice: Subject to any disclaimer, the term of this patent is extended or adjusted under 35 U.S.C. 154(b) by 288 days.

(21) Appl. No.: 14/943,135

(22) Filed: Nov. 17, 2015

Related U.S. Application Data

(60) Provisional application No. 62/083,779, filed on Nov. 24, 2014.

(51) Int. Cl.

| | | |
|---|---|---|
| *A01K 31/00* | (2006.01) | |
| *A01K 45/00* | (2006.01) | |
| *A01K 29/00* | (2006.01) | |
| *H05B 37/02* | (2006.01) | |
| *G02B 26/04* | (2006.01) | |

(52) U.S. Cl.
CPC ............ *A01K 45/00* (2013.01); *A01K 29/005* (2013.01); *G02B 26/04* (2013.01); *H05B 37/0227* (2013.01)

(58) Field of Classification Search
CPC ...... A01K 31/18; A01K 31/005; A01K 31/22; A01K 45/00
See application file for complete search history.

(56) References Cited

U.S. PATENT DOCUMENTS

| | | |
|---|---|---|
| 2,300,727 A | 11/1942 | Durling |
| 2,986,842 A | 6/1961 | Toulmin, Jr. |
| 3,089,280 A | 5/1963 | Klaas |
| 3,352,058 A | 11/1967 | Brant |
| 3,703,051 A | 11/1972 | Vveinberger |
| 3,876,907 A | 4/1975 | Widmayer |
| 3,930,335 A | 1/1976 | Widmayer |
| 3,931,695 A | 1/1976 | Widmayer |
| 4,396,872 A | 8/1983 | Nutter |
| 4,749,916 A | 6/1988 | Yamazaki et al. |
| 5,012,609 A | 5/1991 | Ignatius et al. |
| 5,173,737 A | 12/1992 | Mitchell |
| 5,381,075 A | 1/1995 | Jordan |
| 5,454,187 A | 10/1995 | Wasserman |

(Continued)

FOREIGN PATENT DOCUMENTS

| | | |
|---|---|---|
| EP | 2044835 A1 | 4/2009 |
| JP | 4-75779 A | 3/1992 |

(Continued)

OTHER PUBLICATIONS

Hendricks, Sterling B.; How Light Interacts With Living Matter; Scientific American, Inc.; 1968; pp. 175-186.

(Continued)

*Primary Examiner* — Monica L Williams
(74) *Attorney, Agent, or Firm* — Cochran Freund & Young LLC; James M. Weatherly

(57) ABSTRACT

Embodiments described herein provide systems for stimulating a desired response, such as ovulation and egg laying, hunger, growth, mood and sexual maturity in birds, such as chickens, turkeys, ducks, quail and ostrich, by controlling the duty cycle, wavelength band and frequency of photon bursts to a bird, through the high frequency modulation of photons in an individual color spectrum to the bird and duty cycle, where the photon modulation and duty cycle is based upon the specific needs of the bird.

80 Claims, 14 Drawing Sheets

(56) References Cited

U.S. PATENT DOCUMENTS

| | | |
|---|---|---|
| 5,675,931 A | 10/1997 | Wasserman |
| 5,818,734 A | 10/1998 | Albright |
| 6,396,938 B1 | 5/2002 | Tao |
| 6,615,538 B2 | 9/2003 | Hittin |
| 6,860,225 B2 | 3/2005 | Hebrank |
| 6,940,424 B2 | 9/2005 | Philiben |
| 7,160,717 B2 | 1/2007 | Everett |
| 7,600,343 B2 | 10/2009 | Schultheiss et al. |
| 8,074,397 B2 | 12/2011 | Yoneda et al. |
| 8,181,387 B2 | 5/2012 | Loebl et al. |
| 8,302,346 B2 | 11/2012 | Hunt et al. |
| 8,384,047 B2 | 2/2013 | Shur et al. |
| 2003/0009933 A1 | 1/2003 | Yoneda et al. |
| 2004/0109302 A1 | 6/2004 | Yoneda et al. |
| 2005/0076563 A1 | 4/2005 | Faris |
| 2005/0152143 A1 | 7/2005 | Lee et al. |
| 2005/0152146 A1 | 7/2005 | Owen et al. |
| 2007/0151149 A1 | 7/2007 | Karpinski |
| 2009/0007486 A1 | 1/2009 | Corradi |
| 2009/0047722 A1 | 2/2009 | Wilkerson et al. |
| 2009/0280223 A1 | 11/2009 | Scott |
| 2010/0115830 A1 | 5/2010 | Dube |
| 2010/0121131 A1 | 5/2010 | Mathes |
| 2010/0217358 A1 | 8/2010 | Herbert |
| 2010/0236497 A1 | 9/2010 | Philiben |
| 2010/0244724 A1 | 9/2010 | Jacobs et al. |
| 2011/0109236 A1 | 5/2011 | Zhurin |
| 2011/0115385 A1 | 5/2011 | Waumans et al. |
| 2011/0159562 A1 | 6/2011 | Deisseroth et al. |
| 2011/0209404 A1 | 9/2011 | Scott |
| 2012/0042419 A1 | 2/2012 | Wilson et al. |
| 2012/0067296 A1 | 3/2012 | Hornung |
| 2012/0107239 A1 | 5/2012 | Babbitt et al. |
| 2012/0107921 A1 | 5/2012 | Willson et al. |
| 2012/0270304 A1 | 10/2012 | Johnson et al. |
| 2012/0293472 A1 | 11/2012 | Wong et al. |
| 2013/0008085 A1 | 1/2013 | Aikala et al. |
| 2013/0023044 A1 | 1/2013 | Gleason |
| 2013/0042523 A1 | 2/2013 | Lee et al. |
| 2013/0042527 A1 | 2/2013 | Aikala et al. |
| 2013/0044474 A1 | 2/2013 | Aikala et al. |
| 2013/0047503 A1 | 2/2013 | Aikala et al. |
| 2013/0076239 A1 | 3/2013 | Chung et al. |
| 2013/0139437 A1 | 6/2013 | Maxik |
| 2014/0250778 A1 | 9/2014 | Suntych |

FOREIGN PATENT DOCUMENTS

| | | |
|---|---|---|
| JP | 9-275779 A | 10/1997 |
| JP | 10-178899 A | 7/1998 |
| WO | 2009046548 A3 | 4/2009 |
| WO | 2011086358 A2 | 7/2011 |
| WO | 2011/115123 A1 | 9/2011 |
| WO | 2013/113096 W1 | 8/2013 |
| WO | 2014/138262 A1 | 9/2014 |
| WO | 2015/106380 A1 | 7/2015 |
| WO | 2016/033350 A1 | 3/2016 |

OTHER PUBLICATIONS

PCT/US2014/20809—International Search Report and Written Opinion, Jun. 20, 2014.
United States Standards,Grades, and Weight Classes for Shell Eggs, United States Department of Agriculture, Agricultural Marketing Service, AMS 56, Jul. 20, 2000.
HY-Line W-36 Commercial Layers, Management Guide, Hy-Line International, Jan. 2016.
Response to USPTO non-final office action, U.S. Appl. No. 14/197,949 (Publication 20140250778), dated May 13, 2016.
Non-Final Office Action,U.S. Appl. No. 14/197,949, mailed by USPTO dated Feb. 17, 2016.
The Science of Poultry Lighting. A Bird'S Eye View. Once Innovations, Inc. published online, 2014.
Improved Reproductive Activities of Egg Type Birds by Green Opsin Manipulations, published online, 2014.
Energy Efficiency in Poultry House Lighting, N. Burrow, University of Kentucky,published on line at least as early as 2014.
PCT/US2015/047239—International Search Report and Written Opinion, dated Aug. 27, 2015.
PCT/US2016/054197—International Search Report and Written Opinion, dated Feb. 9, 2017.
Non-Final Office Action,U.S. Appl. No. 15/385,517, mailed by USPTO dated Jun. 26, 2017.
Response to USPTO non-final office action, U.S. Appl. No. 15/385,517, dated May 13, 2016.
EPO Application No. 14761009, European Search Report, dated Sep. 12, 2016.

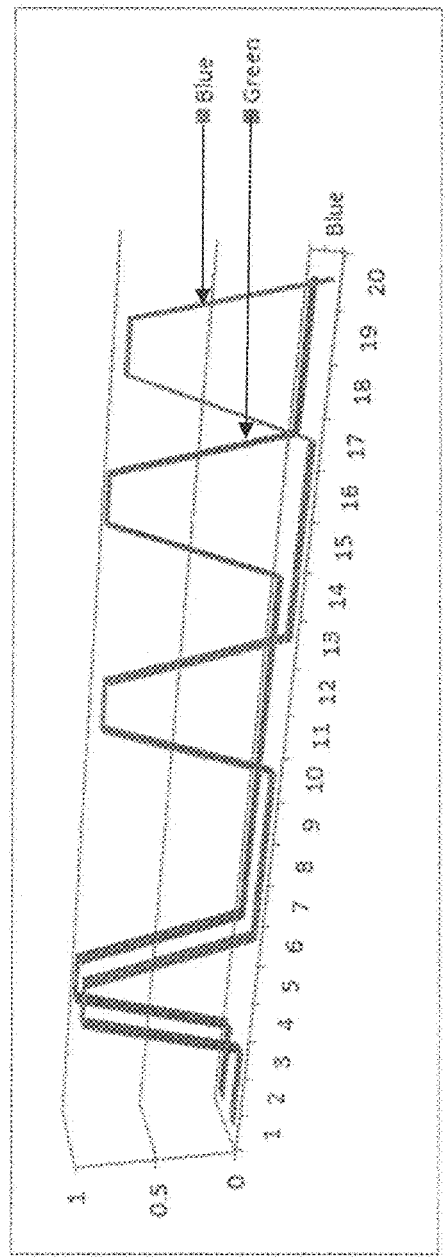

PHOTON MODULATION MANAGEMENT SYSTEM FOR STIMULATION OF A DESIRED RESPONSE IN BIRDS

CROSS REFERENCE TO RELATED APPLICATION

The present application claims priority to U.S. Provisional Application No. 62/083,779, as filed on Nov. 24, 2014, the entire contents are herein incorporated by reference for all the application teaches and discloses.

The foregoing examples of related art and limitations related therewith are intended to be illustrative and not exclusive, and they do not imply any limitations on the inventions described herein. Other limitations of the related art will become apparent to those skilled in the art upon a reading of the specification and a study of the drawings.

SUMMARY

The following embodiments and aspects thereof are described and illustrated in conjunction with systems, tools and methods, which are meant to be exemplary and illustrative, not limiting in scope.

An embodiment of the present invention comprises a system for stimulating a desired response in a bird comprising at least one photon emitter in communication with at least one photon emission modulation controller; wherein said at least one photon emitter is configured to emit at least one first photon pulse, wherein said at least one first photon pulse has a duration, intensity, wavelength band and duty cycle; wherein said duration of said at least one first photon pulse is between 0.01 microseconds and 5000 milliseconds and wherein the duration of the delay between said photon pulses is between 0.1 microseconds and 24 hours; wherein said duty cycle of said first photon pulse is between 0.01% and 90% of constant emission of said at least one photon emitter; wherein said at least one photon emitter is configured to emit at least one additional photon pulse, wherein said at least one additional photon pulse has a duration, intensity, wavelength band and duty cycle, wherein said duration, intensity, wavelength band and duty cycle of said at least one additional photon pulse is different from the said duration, intensity, wavelength band and duty cycle of said at least one first photon pulse; wherein said at least one photon emission modulation controller controls said emission of photons from said photon emitter; wherein said duration of said at least one additional photon pulse is between 0.01 microseconds and 5000 milliseconds and wherein the duration of the delay between said photon pulses is between 0.1 microseconds and 24 hours; wherein said duty cycle of said first photon pulse is between 0.01% and 90% constant emission of said at least one photon emitter; and wherein said at least one first photon pulse and said at least one additional photon pulse induce a desired response in said bird.

Another embodiment of the present invention may comprise a method for inducing a desired response in a bird wherein said method comprises providing at least one photon emitter; providing at least one photon emission modulation controller in communication with said at least one photon emitter; communicating a command from said at least one photon emission modulation controller to said at least one photon emitter; emitting at least one first photon pulse from said at least one photon emitter toward said bird, wherein said at least one first photon pulse has a duration, intensity, wavelength band and duty cycle; wherein said duration of said at least one first photon pulse is between 0.01 microseconds and 5000 milliseconds and wherein the duration of the delay between said photon pulses is between 0.1 microseconds and 24 hours; wherein said duty cycle of said first photon pulse is between 0.01% and 90% of constant emission of said at least one photon emitter; and emitting at least one additional photon pulse from said at least one photon emitter toward said bird, wherein said at least one additional photon pulse has a duration, intensity, wavelength band and duty cycle; wherein said duration, intensity, wavelength band and duty cycle of said at least one additional photon pulse is different from the said duration, intensity, wavelength band and duty cycle of said at least one first photon pulse; wherein said duration of said at least one additional photon pulse is between 0.01 microseconds and 5000 milliseconds and wherein the duration of the delay between said photon pulses is between 0.1 microseconds and 24 hours; wherein said duty cycle of said additional photon pulse is between 0.01% and 90% of constant emission of said at least one photon emitter and wherein a desired response is produced in the bird.

An embodiment of the present invention comprises a system for inducing or stimulating a desired response in a bird comprising at least one photon emitter in communication with at least one photon emission modulation controller; wherein said at least one photon emitter is configured to emit at least one first photon pulse, wherein said at least one first photon pulse has a duration, intensity, wavelength band and duty cycle; wherein said duration of said at least one first photon pulse is between 0.01 microseconds and 25000 microseconds and wherein the duration of the delay between said photon pulses is between 0.1 microseconds and 24 hours; wherein said at least one photon emitter is configured to emit at least one additional photon pulse, wherein said at least one additional photon pulse has a duration, intensity, wavelength band and duty cycle, wherein said duration, intensity, wavelength band and duty cycle of said at least one additional photon pulse is different from the said duration, intensity, wavelength band and duty cycle of said at least one first photon pulse; wherein said at least one photon emission modulation controller controls said emission of photons from said photon emitter; wherein said duration of said at least one additional photon pulse is between 0.01 microseconds and 25000 microseconds and wherein the duration of the delay between said photon pulses is between 0.1 microseconds and 24 hours; and wherein said at least one first photon pulse and said at least one additional photon pulse induces or stimulates a desired response in said bird.

Another embodiment of the present invention may comprise a method for inducing a desired response in a bird wherein said method comprises providing at least one photon emitter; providing at least one photon emission modulation controller in communication with said at least one photon emitter; communicating a command from said at least one photon emission modulation controller to said at least one photon emitter; emitting at least one first photon pulse from said at least one photon emitter toward said bird, wherein said at least one first photon pulse has a duration, intensity, wavelength band and duty cycle; wherein said duration of said at least one first photon pulse is between 0.01 microseconds and 25000 microsecond and wherein the duration of the delay between said photon pulses is between 0.1 microseconds and 24 hours; and emitting at least one additional photon pulse from said at least one photon emitter toward said bird, wherein said at least one additional photon pulse has a duration, intensity, wavelength band and duty cycle; wherein said duration, intensity, wavelength band and duty cycle of said at least one additional photon pulse is different from the said duration, intensity, wavelength band and duty cycle of said at least one first photon pulse; wherein said duration of said at least one additional photon pulse is between 0.01 microseconds and 25000 microseconds and wherein the duration of the delay between said photon pulses is between 0.1 microseconds and 24 hours; and wherein a desired response is induced in the bird.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

FIG. 14 is a graph showing an example of the duration of a photon pulse versus the duration of the delay between photon pulses of two color spectrums, blue and green.

DETAILED DESCRIPTION

Figure 1:
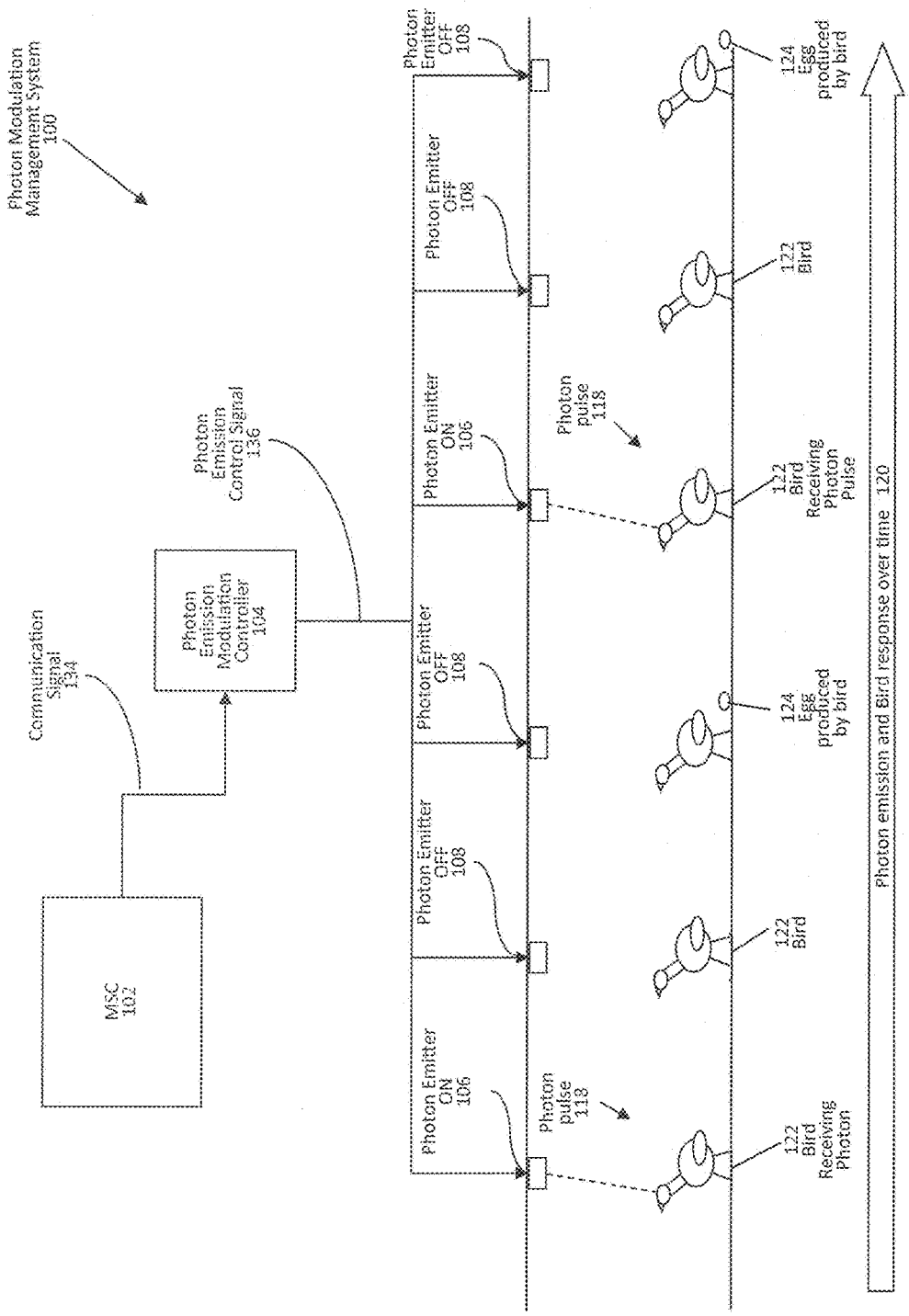
FIG. 1 is a diagram showing an example of a photon modulation growth system for stimulation of egg production.

Embodiments of the present disclosure provide systems, apparatuses and methods for inducing a desired response in egg laying invertebrates, such as birds, including but not limited to, chickens, turkey, ostrich, duck or other birds, where the desired response includes but is not limited to ovulation, hunger, egg production, growth, sexual maturity, including but not limited to by creating electro-magnetic wave emission pulses (photons) of individual color spectrums in sufficient intensity to drive photochemical in a bird to stimulate egg production, using a characteristic frequency or pattern to minimize the required input power necessary to stimulate, while also allowing for the monitoring of the power consumption and other variables of the system. As will be discussed in further detail, by controlling the duty cycle, wavelength band and frequency of photon bursts to a bird, such as stimulation of egg production can not only be influenced by a human, but ovulation and egg production rates, size and quality, hunger, growth and mood can be controlled through the cycling between blue, green, yellow, near-red, far-red, infrared and ultra violet photon modulation.

Specifically by combining multiple wavelengths of photons at specific combination of rates, photochemical response by the birds can be optimized and controlled in order to stimulate egg production, development of pullets (young chickens) and poulets (young turkeys) and the finishing of birds or boilers (birds for meat).

The embodiments of the present disclosure induce a desired response in a bird, such, hunger, sexual maturity, calming or production of eggs at a faster rate than traditional grow light systems using in egg laying or production. Each light "recipe" (combination of color frequencies, modulation cycles, duty cycles, and durations) can be optimized for each desired response to each species of bird.

An additional example embodiment to the methods, systems and apparatuses described herein may include less heat creation: LED lighting intrinsically creates less heat than conventional grow lights. When LED lights are used in a dosing application, they are on less than they are off. This creates an environment with nominal heat production from the LED lights. This is not only beneficial in terms of not having to use energy to evacuate the heat from the system, but is beneficial to the bird because lighting may also be used to reduce animal stress or calm the animal.

For many types of birds, egg production based on a day/night cycle, where longer day lengths induce increased egg production. As winter approaches egg laying decreases with many if not most species of bird. To combat the decrease in egg production, artificial light is often used in egg laying facilities to recreate or mimic a longer day length as opposed to night. Artificial light is often used throughout the chicken production process including but not limited to breeder houses, hatcheries, and broiler houses, to promote bird growth, such as bird growth.

Growing birds within buildings and vertical farms require the usage of powered lighting to provide essential light for egg production and animal growth. These lights often are electrically powered and emit photons used for biological processes such as ovulation, egg laying, muscle growth and development, mood control, and hunger. Examples of various light or photon sources include, but are not limited to, metal halide light, fluorescent light, high-pressure sodium light, incandescent light and LEDs.

While light is the key component of the egg production in birds, this system differs from other historical and even cutting edge lighting technology as it is used as the fundamental controller of bird activity. Likewise, while LED technology is a core component of lighting in the present disclosure, it is a unique application of LED technology coupled with other engineering that dramatically expands the potential for reducing costs, increasing output, and enhancing control compared to existing lighting technology for the commercial production of eggs, breeder hens and broilers for meat.

An embodiment herein includes pulsing individual color spectrums or ranges of color spectrums, including blue, green and/or red spectrums, at a frequency, intensity and duty cycle, which can be customized, monitored and optimized for the specific desired response, such as egg production, hunger, young bird growth and development as well as the finishing of broiler birds for meat while minimizing energy used in the system. By supplying control over the rates and efficiencies of modulated photon energy to the bird, different parts of the photostimulation of the bird's opsins located in the hypothalamus and the retina (such as red opsins and green opsins) photo receptors are maximized allowing for optimal growth or the desired response (such as egg laying) while also allowing for control of a birds response.

Opsins are membrane bound receptors found in the retina and the hypothalamus region of the brain of birds. Opsins mediate a variety of functions in birds, including egg laying and behavior, through the conversion of photons of light into an electrochemical signal.

Photons are massless, elementary particles with no electric charge. Photons are emitted from a variety of sources such as molecular and nuclear processes, the quantum of light and all other forms of electromagnetic radiation. Photon energy can be absorbed by opsins in living birds, and convert it into an electrochemical signal which manipulates a metabolite.

This phenomenon can be seen in the vision opsin chromophore in humans. The absorption of a photon of light results in the photoisomerisation of the chromophore from the 11-cis to an all-trans conformation. The photoisomerization induces a conformational change in the opsin protein, causing the activation of the phototransduction cascade. The result is the conversion of rhodopsin into prelumirhodopsin with an all-trans chromophore. The opsin remains insensitive to light in the trans form. The change is followed by several rapid shifts in the structure of the opsin and also changes in the relation of the chromophore to the opsin. It is regenerated by the replacement of the all-trans retinal by a newly synthesized 11-cis-retinal provided from the retinal epithelial cells. This reversible and rapid chemical cycle is responsible for the identification and reception to color in humans. Similar biochemical processes exist in birds. Phytochromes and pheophytins behave very similarly to opsins in that they can be rapidly regulated to switch between the cis and trans configurations by dosing with differing wavelengths of light.

The responses of birds to the variations in the length of day and night involve photon absorption molecular changes that closely parallel those involved in the vision cycle in humans.

Bird responses to specific photon modulation may be monitored depending upon the desired response. When the desired response is the production of eggs, the bird may be monitored for the release of luteinizing hormones, a heterodimeric glycoprotein to indicate impending ovulation in female birds. Luteinizing hormones may be monitored via blood or urinary samples. Samples may be taken daily or at various times during the day to identify the birds reaction to the photon modulation to ensure efficient egg production.

The present disclosure also provides methods and systems for the amount of electric power used in the process of bird egg production, as well as young and broiler bird growth and development, to be monitored and reduced, where the amount of energy delivered can be defined by calculating the total area under the graph of power over time. The present disclosure further provides methods and systems that allow for the monitoring, reporting and control of the amount of electric power used to stimulate a desired response in a bird, allowing an end user or energy provider to identify trends in energy use.

An embodiment of the system of the present disclosure comprises at least one photon emitter, such as an LED in communication with a photon emission modulation controller, including but not limited to a digital output signal or a solid-state relay. Photon emitters are modulated to send a pulse of photons, where each individual pulse comprises at least one color spectrum, wavelength or multiple color spectrums or wavelengths. Each photon pulse is directed toward a bird for a duration of time, such as two milliseconds, with a duration of delay between photon pulses, such as two hundred milliseconds or up to 24 hours.

As used herein "bird" includes warm-blooded, egg-laying vertebrates, including but not limited to, chickens, quail, turkeys, water fowl, ostriches, pheasant, game birds, doves, pigeons and grouse.

As used herein, "duty cycle" is the length of time it takes for a device to go through a complete on/off cycle. Duty cycle is the percent of time that an entity spends in an active state as a fraction of the total time under consideration. The term duty cycle is often used pertaining to electrical devices, such as switching power supplies. In an electrical device, a 60% duty cycle means the power is on 60% of the time and off 40% of the time. An example duty cycle of the present disclosure may range from 0.01% to 90% including all integers in between.

As used herein "frequency" is the number of occurrences of a repeating event per unit time and any frequency may be used in the system of the present disclosure. Frequency may also refer to a temporal frequency. The repeated period is the duration of one cycle in a repeating event, so the period is the reciprocal of the frequency.

In an embodiment of the present disclosure and as will be described in further detail below, the emission of two or more photon pulses from the growth system described herein for a duration, intensity, wavelength band and duty cycle induces a gain efficiency greater than 1 where Gain=Amplitude out/Amplitude in.

FIG. 1 provides a block diagram showing an example of a photon modulation management system 100. As shown in FIG. 1, a photon emitter 106, 108, 110, 112, 114 and 116 is shown over a period of time in communication with a photon emission modulation controller 104 for the purpose of modulating the emission of photons to a bird for inducing a wide range of desired responses in birds including but not limited to ovulation, sexual maturity, mood and hunger. The modulated application of photons to a bird by providing photon pulses of one or more frequencies followed by pulses of one or more other frequencies for a duration along with a delay between pulses, allows for peak stimulation/modulation of a bird's biological components (opsins receptors) and biological responses, such as a the pulsing of one or more specific spectrums of light to induce a specific electrochemical signal for the production of a specific metabolite. Further the modulation of photons to a bird allows for the optimization of photon absorption by opsin receptors without oversaturation of the receptors. As described below, the modulation of the photon pulses increase energy and heat efficiency of current poultry production lighting systems by reducing the overall power draw by the system of the present disclosure as much as 99% or more of the photon source when compared to conventional poultry production lighting systems, such as a 60 watt grow light, thereby reducing the amount of power and cost used to facilitate egg production from a bird. In an example of the energy saving potential of the system of the present disclosure, the system pulses 49.2 watts of photons for two microseconds per 200 microseconds creating an effective power consumption of 0.49 watt-hrs/hr on the power payment meter or 0.82% of the power in a 60 watt standard incandescent bulb. In addition, because the photon emitter is not continuously emitting photons, the amount of heat produced from the photon emitter will be significantly reduced, thereby significantly reducing the cost of cooling a facility to compensate for the increased heat from lighting. The system of the present disclosure may be customized based upon bird-specific requirements for photon intensity, pulse ON duration, pulse OFF (or duty cycle), the light spectrum of the pulse including but not limited to white, near-red, yellow, green, and blue, orange, far-red, infrared, and ultra-violet to encourage optimal ovulation, hunger, mood and sexual development for selected birds such as chickens, ducks, quail or turkeys.

As shown in FIG. 1, a master logic controller (MLC) 102, such as solid-state circuit with digital output control or a central processing unit (CPU) is in communication with a photon emission modulation controller 104 by means of a communication signal 134. The MLC 102 provides the system of the present disclosure with input/output of the parameters and the appropriate instructions or the specialized functions for the modulation of photons from a photon emitter 106 and 108.

In a further embodiment, the MLC 102 may be hard wired or wireless to an external source such as a host, allowing external access to the MLC 102 by a host. This allows remote access by a user to monitor the input and output of the MLC 102, provide instructions or control to the systems while also allowing for remote programming and monitoring of the MLC 102.

In a further embodiment, a power measurement or power consumption sensor may be integrated or embedded into the MLC 102 in the form of an integrated circuit allowing for the measurement and reporting of the power consumption of the system based on the voltage and the current draw of the system of the present disclosure. The power consumption of the system can then be communicated either wirelessly or by hardwire from the MLC 102 to a host. Data, including power consumption may also be sent to an outside receiver such as a database that is not connected to the system.

The photon emission modulation controller 104 receives commands and instructions from the MLC 102 including but not limited to the intensity, duty cycle, wavelength band and frequency of a photon pulse 118 from a photon emitter 106 and 108. The photon emission modulation controller 104 may be any device that modulates the quanta and provides the control and command for the intensity, duty cycle, wavelength band and frequency of a photon pulse from a photon emitter 106 and 108. A variety of devices may be used as the photon emission modulation controller 104, including but not limited to a solid-state relay (SSR), such as the Magnacraft 70S2 3V solid-state relay from Magnacraft Inc., an incandescent (Tungsten-halogen and Xenon), Fluorescent (CFL's), high intensity discharge (Metal Halide, High-Pressure Sodium, Low-Pressure Sodium, Mercury Vapor), sunlight, light emitting diodeoptical chopper and a device that induces modulation of a photon pulse. It should be understood that this description is applicable to any such system with other types of photon emission modulation controllers, including other methods to cycle a light or photon source on and off, cycling one or more colors or spectrums of light at different times, durations and intensities, such as near-red, green, blue and far-red, allowing multiple pulses of one spectrum before pulsing another spectrum, as will be understood by one skilled in the art, once they understand the principles of the embodiments.

As shown in FIG. 1, based on the instructions from the MLC 102, the photon emission modulation controller 104 sends a photon emission control signal 136 to a photon emitter 106. When the photon emission control signal 136 is sent to the photon emitter 106 goes ON, the photon emitter 106 emits at least one photon pulse 118 where each photon pulse comprises one color spectrum or multiple color spectrums of light, which is transmitted to a bird 122. Then based on the instructions from the MLC 102, when the photon emitter control signal 136 sent to the photon emitter 108 goes OFF, the photon emitter 108 will not emit a photon pulse, and therefore no photons are transmitted to a bird 122. As shown in FIG. 1, starting from the left side of FIG. 1, the emission of photons 118, such as a pulse of far-red photons, and bird 122 ovulation and egg production 124 is shown over a period of time 120. The example of FIG. 1 provides a photon pulse 118, such as far-red, emitted from a photon emitter 106 for two (2) milliseconds with a duration of delay of two hundred (200) milliseconds before a second photon pulse 118 is emitted from the same photon emitter 106 for two milliseconds (please note that FIG. 1 is a descriptive example of photon pulses emitted over time. FIG. 1 is not drawn to scale and the amount of growth by the bird between pulses in FIG. 1 is not necessarily accurate).

As will be understood by one skilled in art, in an additional embodiment, the system as described in FIG. 1 may be completely housed in an individual photon emitter, allowing each individual photon emitter to be self-sufficient, without the need for an external control or logic unit. An example self-sufficient photon emitter may be in the form of a unit that may be connected to a light socket, or light fixtures that may be suspended above one or more birds and connected to a power source.

The systems as shown in FIG. 1 may also take the form of a master/slave system, as will be discussed in FIG. 4, where by example, a master photon emitter containing all logic and controls for the emission of photon from master photon emitter as well as any additional photon emitters in communication with the master photon emitter.

A variety of power supplies may be used in the present disclosure. These sources of power may include but are not limited to battery, converters for line power, solar and/or wind power. The intensity of the photon pulse may be static with distinct on/off cycles or the intensity may be changes of 5% or larger of the quanta of the photon pulse. The intensity of the photon pulse from the photon emitter can be controlled through the variance of voltage and/or current from the power supplies and delivered to the light source. It will also be appreciated by one skilled in the art as to the support circuitry that will be required for the system of the present disclosure, including the photon emitter control unit and the photon emitters. Further, it will be appreciated that the configuration, installation and operation of the required components and support circuitry are well known in the art. The program code, if a program code is utilized, for performing the operations disclosed herein will be dependent upon the particular processor and programming language utilized in the system of the present disclosure. Consequently, it will be appreciated that the generation of a program code from the disclosure presented herein would be within the skill of an ordinary artisan.

Figure 2:
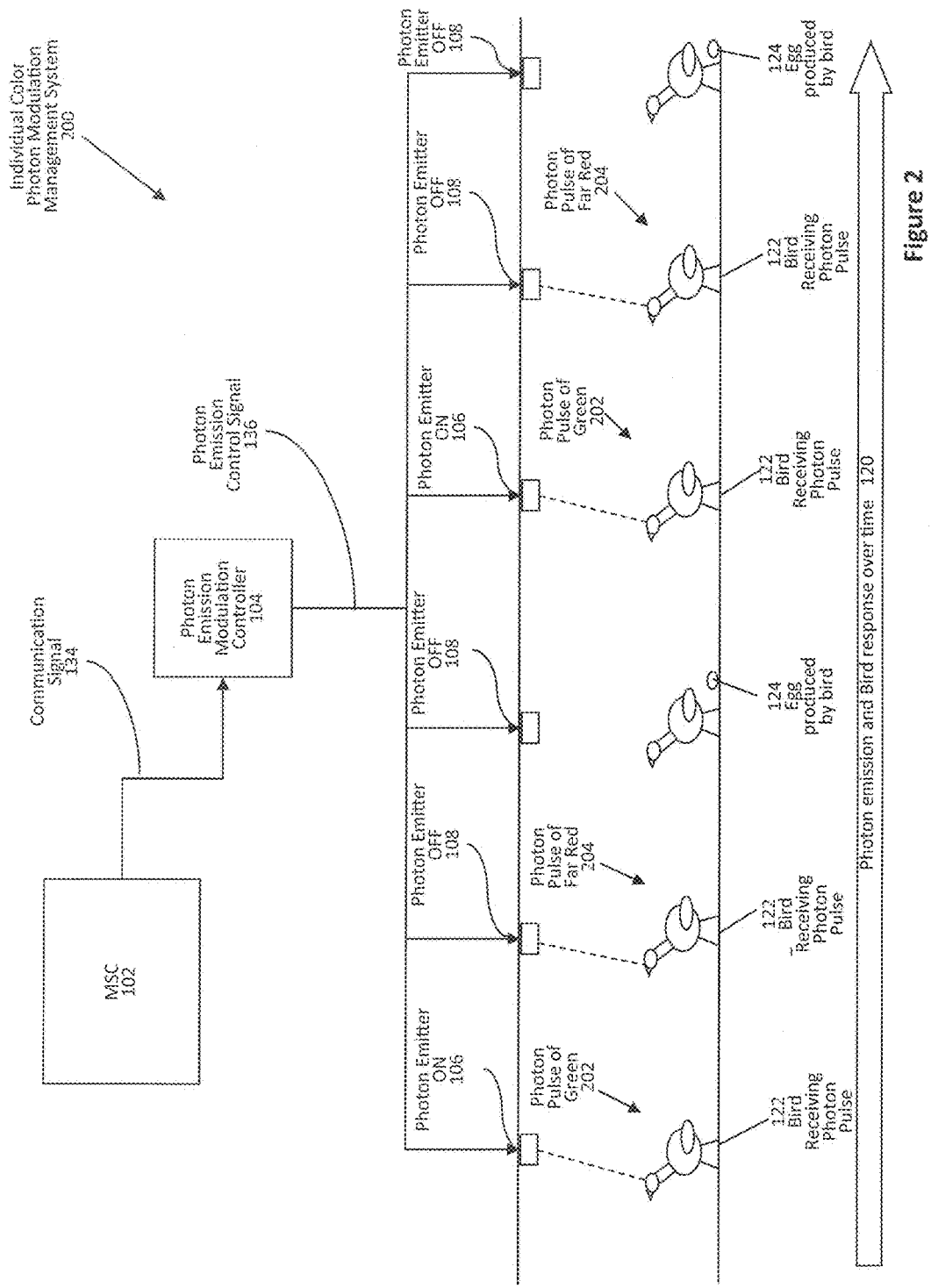
FIG. 2 is a diagram showing an example of an individual color photon modulation growth system pulsing different specific wavelengths of light to induce egg production.

FIG. 2 provides a second block diagram showing an example of a photon modulation management system 200. As shown in FIG. 2 and repeated from FIG. 1, a photon emitter 106 and 108 is shown over a period of time in communication with a photon emission modulation controller 104 for the purpose of modulating individual pulses of photons comprising individual color spectrums to a bird, including but not limited to white, green, near-red, blue, yellow orange, far-red, infrared, and ultra-violet color spectrums, wavelength between 0.1 nm and 1 cm. As will be understood by one skilled in the art, the present disclosure may include color spectrums of specific, individual wavelengths between 0.1 nm and 1.0 cm, or may include a range or band of wavelengths 0.1 to 200 nm in width, herein "wavelength band."

The modulation of individual color spectrums of photons to a bird by providing specific color spectrum pulses for a duration along with a delay between pulses, allows for peak stimulation of a bird's biological components and responses, such as a bird's retina opsins and hypothalamus opsins for egg production. Examples of the ability to control specific aspects of a bird's biological components or responses through the pulsing of individual color spectrums, specific color wavelength or a range of color wavelengths may include but are not limited to:

a. egg production through the modulation of pulses of a specific far-red wavelengths (such as 730 nm, an example wavelength range may include 710 to 850 nm) for a period of time;

b. hunger, growth, sexual development as well as helps to control the mood of the birds by pulses of blue light, as well as the regulation of circadian rhythms (an example range may include with a range of 450 to 495 nm); and c. green light (such as 560 nm) may be used to promote or stimulate growth, including muscle growth, improve reproduction as well as egg quality.

The modulation of individual color spectrums, specific wavelength and a range of wavelengths of photons to a bird by providing specific color spectrum pulses for a duration along with a delay between pulses also allows for the control of growth or biological responses, such as mood, growth, ovulation, sexual maturity, and hunger in birds. An example may include one light or through the combination of many lights, cycling the lights on and off to control ovulation and growth in a bird.

As shown in FIG. 2 and repeated from FIG. 1, a master logic controller (MLC) 102 is in communication with a photon emission modulation controller 104 by means of a communication signal 134. The MLC 102 provides the system of the present disclosure with input/output of the parameters and the appropriate instructions or the specialized functions for the modulation of a specific individual color spectrum of photons from a photon emitter 106 and 108.

The photon emission modulation controller 104 receives commands and instructions from the MLC 102 including but not limited to the intensity, duty cycle, color spectrum and frequency of each specific color spectrum photon pulse 202 and 204 or a plurality of pulses of a specific color spectrum from a photon emitter 106 and 108. The photon emission modulation controller 104 provides the control and command for the intensity, duty cycle, color spectrum and frequency of each specific color spectrum photon pulse 202 and 204 or a plurality of pulses from a photon emitter 106, 108, 110, 112, 114 and 116.

As shown in FIG. 2, based on the instructions from the MLC 102, the photon emission modulation controller 104 sends a photon emission control signal 136 to a photon emitter 106 and 108. When the photon emission control signal 136 sent to the photon emitter 106 ON, the photon emitter 106 emits one or more photon pulses of a specific color spectrum 202 or 204, which is transmitted to a bird 122. Then based on the instructions from the MLC 102, when the photon emitter control signal 136 sent to the photon emitter 108 goes OFF, the photon emitter 108 will not emit a photon pulse, and therefore no photons are transmitted to a bird 122. As shown in FIG. 2, starting from the left side of FIG. 2, the emission of photons of a specific color spectrum 202 (green) and 204 (far-red) and bird 122 ovulation and egg production 124 is shown over a period of time 120. The example of FIG. 2 provides a photon pulse or plurality of pulses of a green color spectrum 202 emitted from a photon emitter 106 for two (2) milliseconds, followed by a photon pulse or plurality of pulses of a far-red color spectrum 204 for a duration of two (2) milliseconds with a duration of delay of two hundred (200) milliseconds of each pulse before a second photon pulse or plurality of pulses 202 is emitted from the same photon emitter 106 for two milliseconds followed by a second photon pulse or plurality of pulses of a far-red color spectrum 204 for a duration of two milliseconds from the same photon emitter 114 (please note that FIG. 2 is a descriptive example of photon pulses emitted over time. FIG. 2 is not drawn to scale and the amount of growth or egg production by the bird between pulses in FIG. 2 is not necessarily to scale).

The system of the present disclosure as described in FIGS. 1 and 2 allows for the manipulation and control of various responses by a bird through the cycling of one or more colors or spectrums of light at different times, durations and intensities, such as near-red, green, blue and far-red, allowing single pulses or multiple pulses of one spectrum with a delay before pulsing another spectrum. The pulsing of individual color spectrums in unison or individually for a duration with a delay between pulses allows for increased efficiency and speed from ovulation to finishing through control of the bird responses. The system described herein provides the ability to keep a bird in a particular response such as hunger or a specific mood.

By way of example, studies have shown that using the pulse of specific color spectrums to a bird, groups of birds may be induced to ovulate. At this point protocols may be changed on one group to encourage and allow for hunger or mood control.

A variety of photon emitters may be used to provide photons, many of which are known in the art. However, an example of a photon emitter appropriate for the present discussion is a LED, which may be packaged within an LED array designed to create a desired spectrum of photons. While LEDs are shown in this example, it will be understood by one skilled in the art that a variety of sources may be used for the emission of photons including but not limited to metal halide light, fluorescent light, high-pressure sodium light, incandescent light and LEDs. Please note that if a metal halide light, fluorescent light, high-pressure sodium light, incandescent light is used with the methods, systems and apparatuses described herein, the proper use of these forms of photon emitters would be to modulate and then filter the light to control what wavelength for what duration is passed through.

Embodiments of the present disclosure can apply to LEDs having various durations of photon emissions, including durations of photon emissions of specific color spectrums and intensity. The pulsed photon emissions of specific color spectrums may be longer or shorter depending on the bird in question, the age of the bird and how the emission will be used in facilitating biochemical processes for bird growth.

The use of an array of LEDs may be controlled to provide the optimal photon pulse of one or more color spectrums for specific bird ovulation growth such as chickens or turkeys. The user may simply select the photon pulse intensity, color spectrum, frequency and duty cycle for a particular type of bird to encourage efficient biological responses in birds. LED packages can be customized to meet each bird's specific requirements. By using packaged LED arrays with the customized pulsed photon emission, as discussed above, embodiments described herein may be used to control light to alter the shell thickness, bird weight, and sexual maturity within the target bird.

Figure 3:
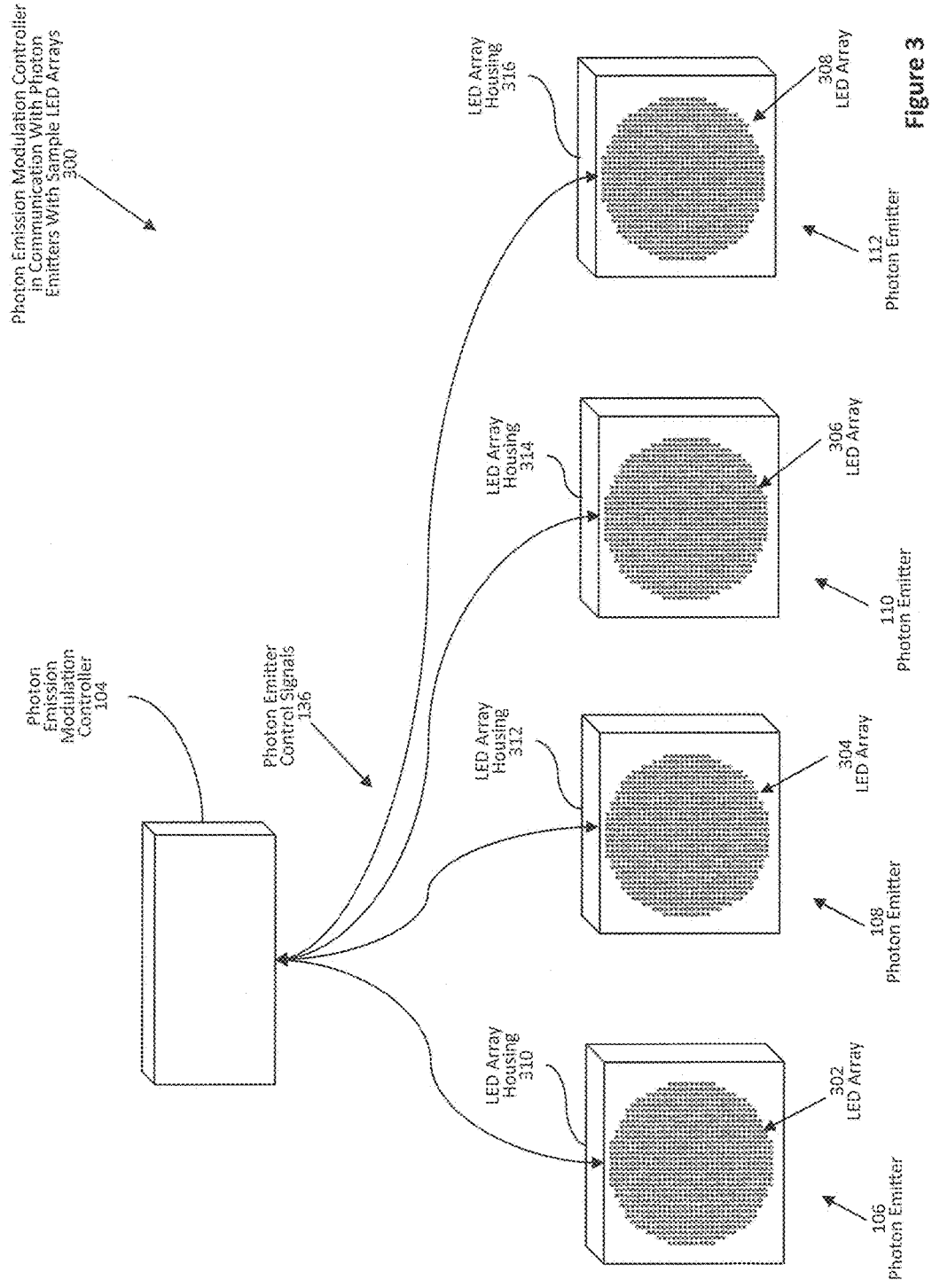
FIG. 3 is a diagram showing a photon emission modulation controller in communication with a plurality of photon emitters with sample LED arrays.

FIG. 3 is a diagram of an example of a plurality of photon emitters 106, 108, 110 and 112 with LED arrays 300. As shown in FIG. 3, a photon emission modulation controller 104 is in communication by means of a plurality of photon emitter control signals 136 with a plurality of photon emitters 106, 108, 110 and 112. As further shown in FIG. 3, each photon emitter 106, 108, 110 and 112 comprises an array of LEDs 302, 304, 306 and 308. Each array of LEDs 302, 304, 306 and 308 and the circuitry to allow for the array of LEDs to communicate with the photon emission modulation controller 104 are contained in an LED array housing 310, 312, 314 and 316.

As shown in FIG. 3, the shape of LED array is a circle, however as will be understood by one skilled in the art, the shape of the array may take a variety of forms based upon the needed biological response of the birds. The shape of the array may include but is not limited to, circular, square, rectangular, triangular, octagonal, pentagonal and a variety of other shapes.

The LED array housing 310, 312, 314 and 316 for each photon emitter 106, 108, 110 and 112 may be made of a variety of suitable materials including, but are not limited to, plastic, thermoplastic, and other types of polymeric materials. Composite materials or other engineered materials may also be used. In some embodiments, the housing may be made by a plastic injection molding manufacturing process. In some embodiments, the housing may be transparent or semi-transparent and in any color.

Figure 4:
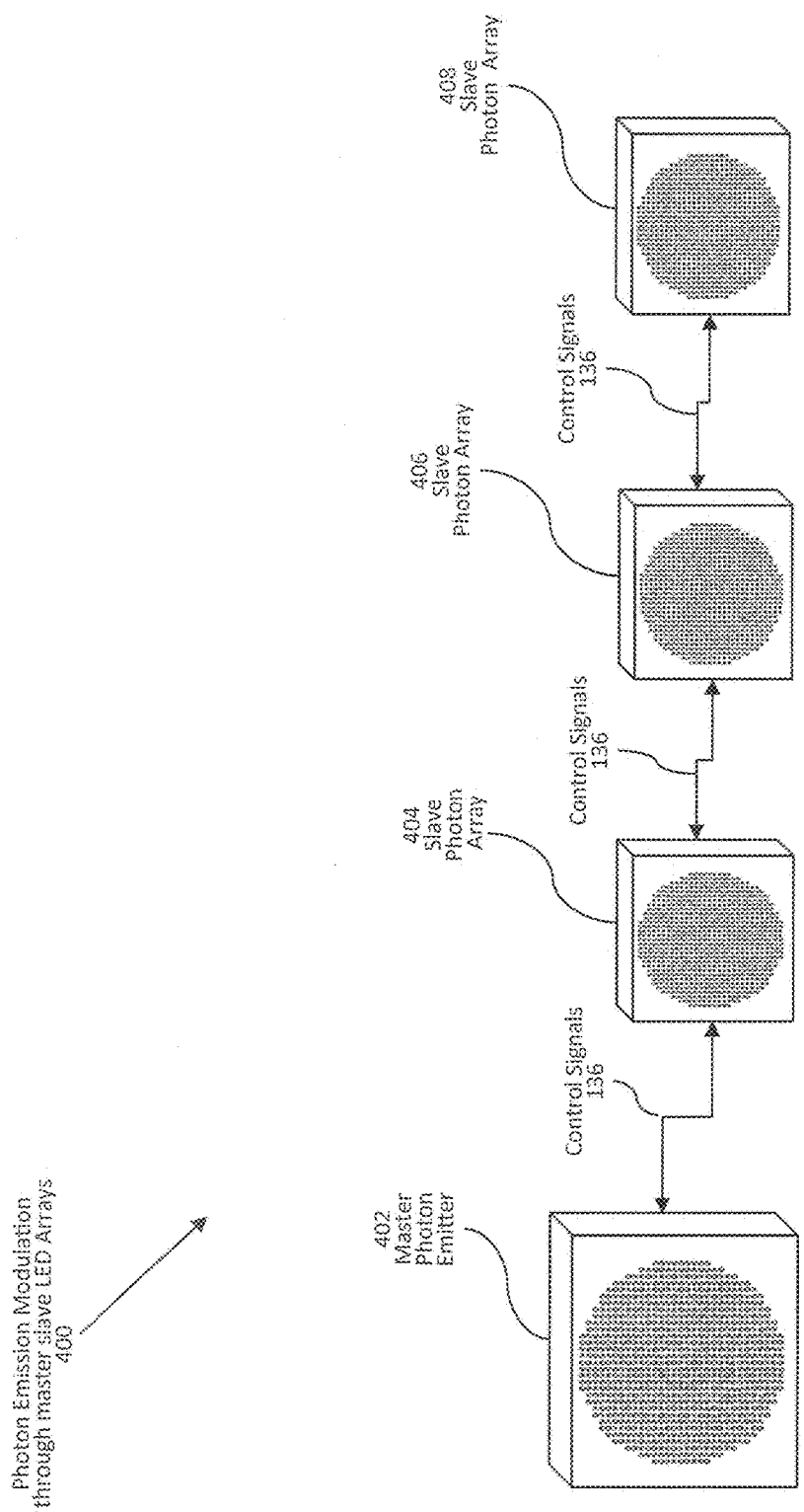
FIG. 4 is a diagram showing photon emission modulation through a master/slave LED array.

FIG. 4 is a diagram of an example of a plurality of photon emitters with a master photon emitter in communication and control of one or more slave photon emitters, 400. As shown in FIG. 4, a master photon emitter 402 is in communication by means of a photon control signal 136 with a series of slave photon emitters 404, 406, and 408. The master photon emitter 402 contains a controller, such as the MLC (102 of FIGS. 1 and 2), as well as photon emission modulation controller (shown as 104 FIGS. 1 and 2) which controls the intensity, duty cycle and frequency of each specific color spectrum photon pulse from an array of LEDs housed within the master photon emitter 402 while also allowing the master photon emitter to control the intensity, duty cycle and frequency of each specific color spectrum photon pulse from each slave photon emitters 404, 406, and 408.

Conversely, each slave photon emitter 404, 406, and 408 contains the circuitry to receive command signals 136 from the master photon emitter 402 and the circuitry necessary to emit a pulse of a specific spectrum from an array of LEDs (such as near-red, far-red, blue, green or orange) housed within each slave photon emitter 404, 406, and 408. For clarity, each slave photon emitter does not contain a controller such as the MLC nor does the slave photon emitter 404, 406, and 408 contain a photon emission modulation controller. All commands and controls for the slave photon emitter 404, 406, and 408 are received from the master photon emitter 402. This master/slave system allows for sharing of a single power supply and microcontroller. Master has the power supply and that power is also transferred to the slaves. Additionally, the master/slave system can be utilized to pulse photons in patterns to help stimulate the biological response in other birds.

A bus system may be included in MLC of the master photon emitter 402 or in each slave photon emitter 404, 406 and 408 to allow for the specific control by the master photon emitter 402 of each individual slave photon emitter 402, 404 and 408. By way of example, the master photon emitter 402 may send a signal 136 to a specific slave photon emitter 404 commanding the slave photon emitter 404 to emit a far-red pulse for a specific duration, while the master photon emitter 402 simultaneously sends a command signal 136 to a second slave photon emitter 406 to emit a green pulse for a specific duration. While this descriptive example shows an array, plurality or chain of three slave photon emitters 402, 404 and 406 in communication with a master photon emitter 402, it should be understood that this description is applicable to any such system with any number of slave photon emitters in communication and under the control of a master photon emitter, as will be understood by one skilled in the art, once they understand the principles of the embodiments.

In a further embodiment, the master photon emitter 402 may be hard wired or wireless to allow external access to the master photon emitter 402 by a host, allowing remote access to monitor the input and output of the master photon emitter 402 while also allowing for remote programming of the master photon emitter.

Figure 5:
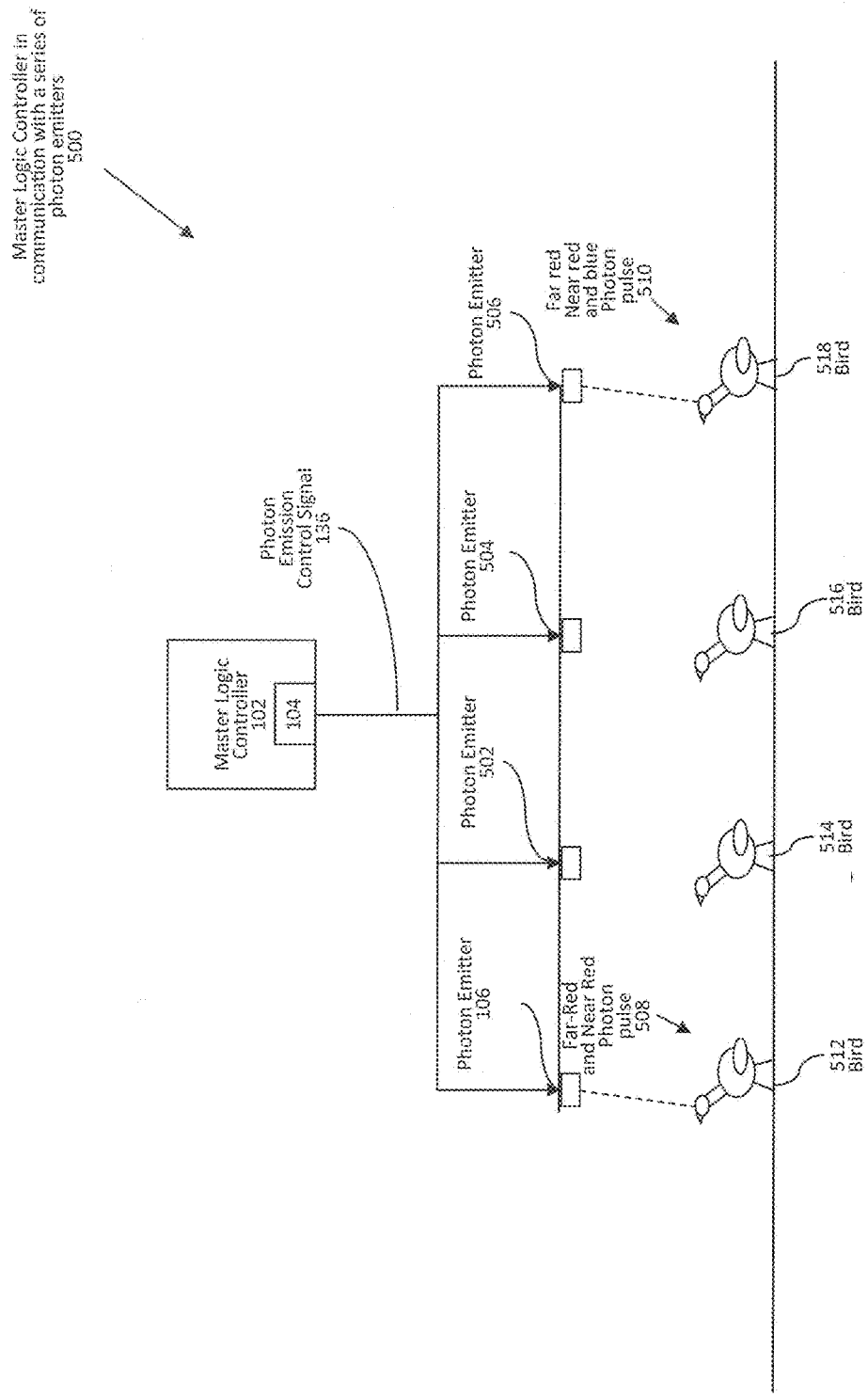
FIG. 5 is a diagram showing a master logic controller in communication and control of a series of photon emitters.

FIG. 5 is a diagram of an example of a master logic controller in communication and control of one or more photon emitters, 500. As shown in FIG. 5, a master logic controller 102 is in communication by means of a photon emission control signal 136 with a series of photon emitters 106, 502, 504 and 506 located above four different birds 512, 514, 516 or 518. In this example, the master logic controller or MLC 102 (as previously discussed in FIGS. 1, 2 and 3) also contains a photon emission modulation controller 104 (shown discussed in FIGS. 1, 2 and 3) which allows the MLC 102 to control the intensity, duty cycle and frequency of each specific color spectrum photon pulse from an array of LEDs housed within each photon emitter 106, 502, 504 and 506.

Through the photon emission modulation controller 104, the MLC 102 communicates commands and instructions to each photon emitter 106, 502, 504 and 506 including but not limited to the intensity, duty cycle and frequency of each specific color spectrum photon pulse 508 and 510 from each photon emitter 106, 502, 504 and 506. The MLC 102 also maintains control of the power supply to the system and control the transfer of power to each individual photon emitter 106, 502, 504 and 506.

As shown in FIG. 5, based on the instructions from the MLC 102, the photon emission modulation controller 104 sends a photon emission control signal 136 to each individual photon emitter 106, 502, 504 and 506. Based on the specific instructions sent to each photon emitter 106, 502, 504 and 506, individual photon emitters 106 or 506 may pulse one or more specific color spectrums 508 and 510 to a bird 512, 514, 516 or 518 (such as a pulse of both far-red and near-red 508 at various durations or a pulse of far-red, near-red and blue at various durations 510). As further shown in FIG. 5, based on the instructions from the MLC 102, other individual photon emitters 502 or 504 may not emit a photon pulse toward a bird 122 for a duration.

The ability of the MLC 102 to control the photon output or emitted from each individual photon emitter 106, 502, 504 and 506 allows the system of the present disclosure to modify the photon emission to a bird based on the specific needs or requirements for a bird. As discussed in association with FIG. 2, by way of example, the MLC may be programmed to issue a signal to a specific emitter for modulation of pulses of far-red light for a period of time followed by pulses of blue light in combination with near-red light for the control of a biological responses in birds such as ovulation/egg laying and mood/hunger.

In the example shown in FIG. 5, all commands and controls for each photon emitter 106, 502, 504 and 506 are received externally from the MLC 102. However, as will be understood by one skilled in the art, the logic and hardware associated with the MLC 102 and photon emission modulation controller 104 may also be housed within each individual photon emitter, allowing each individual photon emitter to be self-sufficient, without the need for an external control or logic unit.

In a further embodiment, the MLC 102 may be hard wired or wireless, allowing external access to the MLC 102 by a user. This allows remote access by a user to monitor the input and output of the MLC 102 while also allowing for remote programming of the MLC 102.

Figure 6:
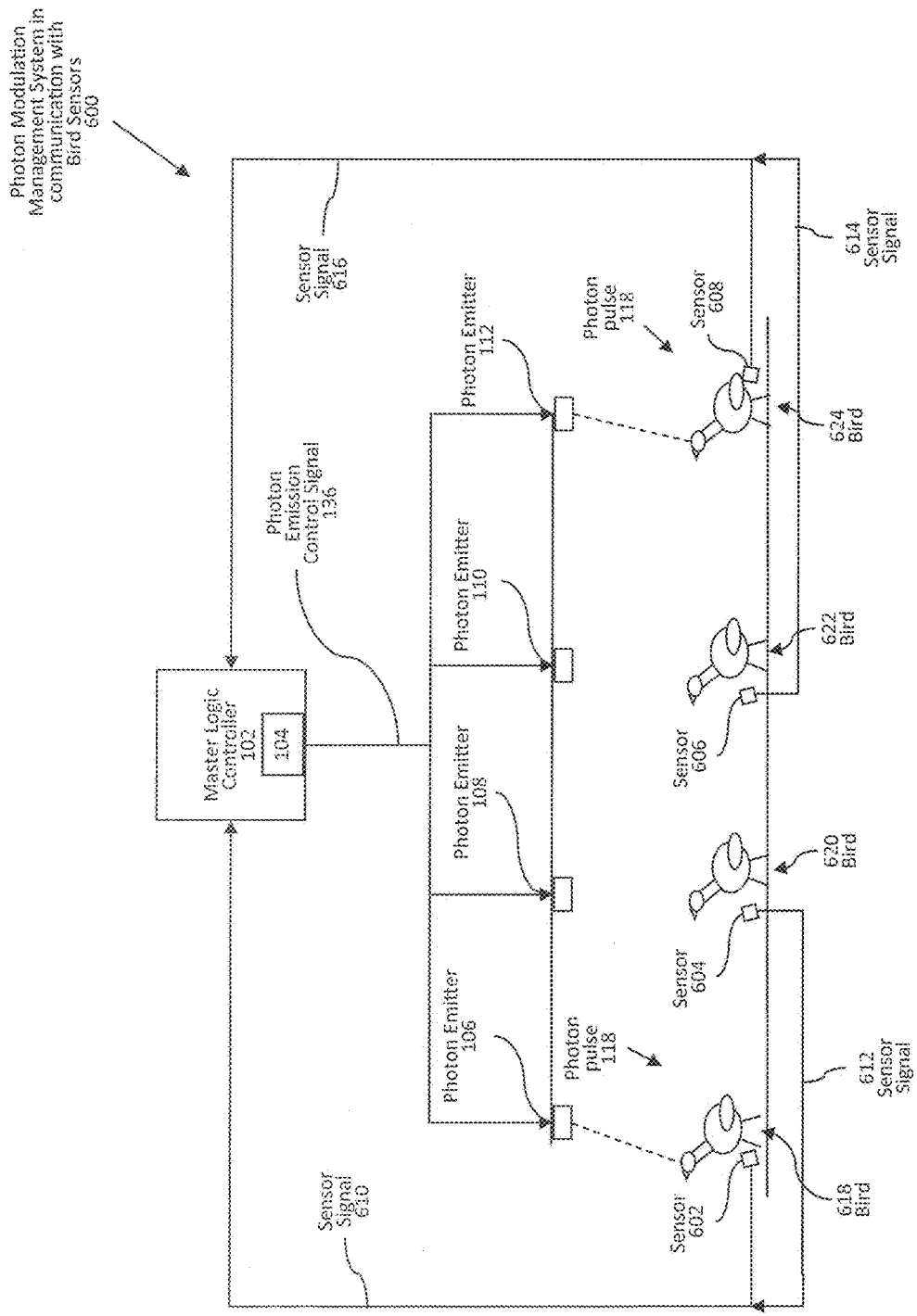
FIG. 6 is a diagram showing a photon modulation management system in communication with a series of bird sensors.

FIG. 6 provides an example of a further embodiment, showing the photon modulation system of the present disclosure where one or more sensors are used to monitor a bird's environmental conditions as well as the bird's responses 600. As shown in FIG. 6, one or more sensors 602, 604, 606 and 608 are associated with each bird 618, 620, 622, and 624 in order to monitor various conditions associated with the bird 618, 620, 622, and 624. The conditions associated with the bird or bird which may be monitored include but are not limited to, humidity, air temperature, volume, movement, $O_2$, $CO_2$, CO, pH, and weight. As will be understood by one skilled in the art, the sensors may include but are not limited to: temperature sensor, an infrared sensor, motion sensor, microphones, gas sensors, cameras, and scales.

The sensors 602, 604, 606 and 608 monitor one or more conditions associated with the bird or bird 618, 620, 622, and 624 and then transmit the data 610, 612, 614 or 616 to the MLC 102. Transferring the data from the one or more sensors 602, 604, 606 and 608 to the MLC 102 can be accomplished in a number of ways, either wirelessly or hard wired. As will be understood by one skilled in art, a variety of communication systems may be used for the delivery of sensor-derived information from the bird 618, 620, 622, and 624 to the a MLC 102.

The data from the one or more sensors 602, 604, 606 and 608 is analyzed by the MLC 102. Based on the information from the sensors, the MLC 102, through the photon emission modulation controller 104, the MLC 102 is able to adjust the intensity, duty cycle and frequency of each specific color spectrum photon pulse 608 and 610 of each individual photon emitter 106, 602, 604 and 606, or to adjust the intensity, duty cycle and frequency of a group of photon emitters based on the needs of the individual birds 618, 620, 622, and 624 associated with a specific sensor 602, 604, 606 and 608 or the needs of the birds as a whole. An example may include adjusting a pulse to comprise both blue and far-red 608 at various durations or adjusting duration of a pulse of far-red, green and blue 610.

In additional embodiments, the system of the present disclosure may also include a watering system, feeding systems, environmental as well as health system (not shown in FIG. 6) in communication and under the control of the MLC 102 or a separate logic controller. Based on information from the sensors 602, 604, 606 and 608 associated with each bird or bird, the MLC 102 is able to communicate with a watering system, feeding system, heating and cooling systems, medication systems based upon the needs of the birds. Data, including power can be sent to an outside receiver such as a database that is not connected to the system.

Figure 7:
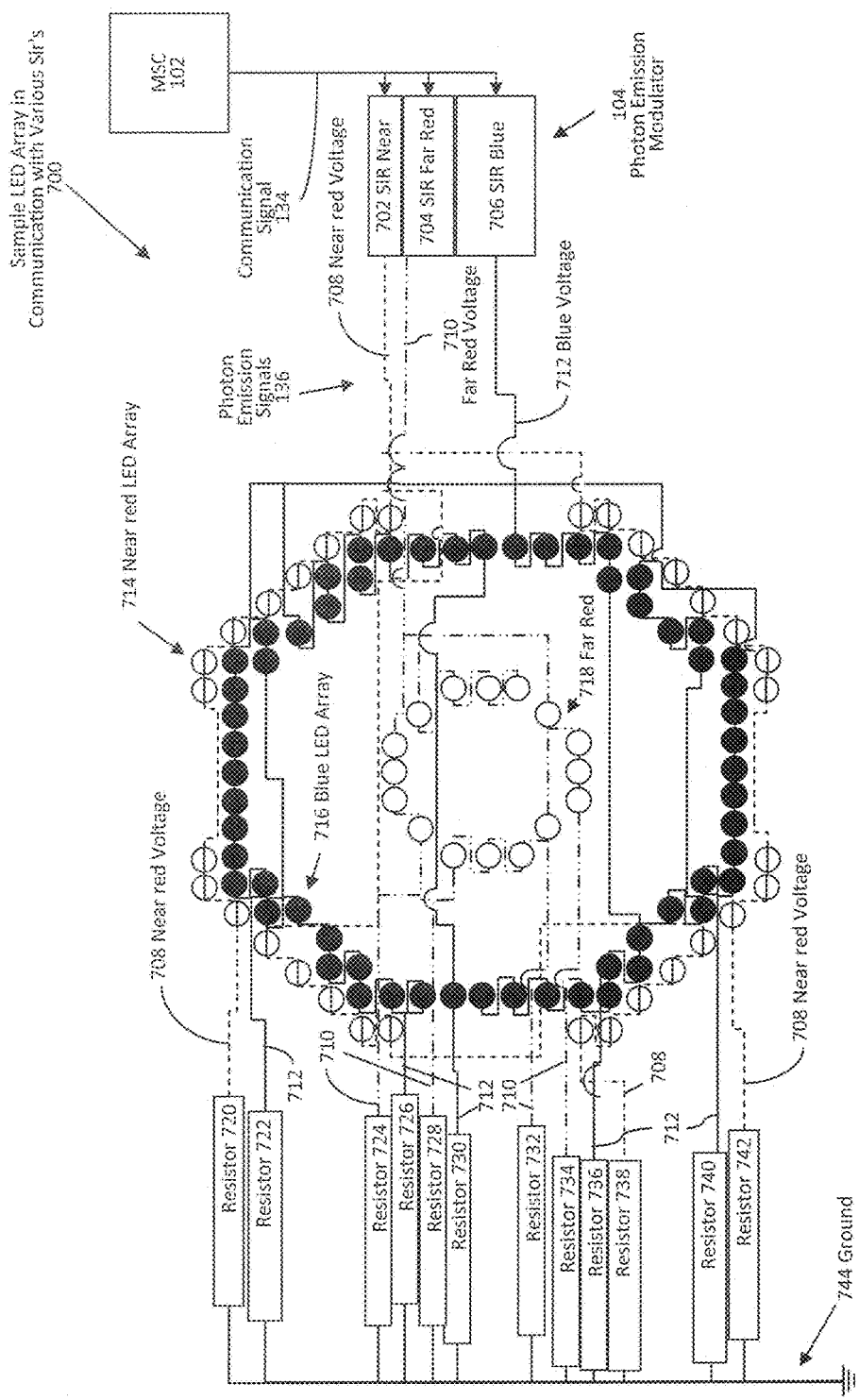
FIG. 7 is a diagram showing a sample LED array in communication with various SSRs (Solid State Relays) or FETS.

FIG. 7 provides an example of one embodiment of an array of LEDs in communication with a series of solid-state relays or SSRs 700. As shown in FIG. 7 and repeated from FIG. 1, a MLC 102 is in communication by means of a communication signal 134 with a photon emission modulation controller 104. The photon emission modulation controller 104 of this example contains three SSRs. The MLC 102 outputs a signal to control the SSRs. The first SSR controls an array of near-red LEDs 702, the second SSR controls an array of far-red LEDs 704 and the third SSR to controls an array of blue LEDs 706. Each SSR 702, 704 and 706 is in communication with an array of LEDs, 714, 716 and 718 by means of a photon emission signal 136. As shown in FIG. 7, the near-red SSR 702 sends a photon emission signal 136 to initiate a photon pulse of the near-red LEDS 714 comprising a near-red voltage 708 to an array of near-red LEDs 714. The near-red voltage 708 is then transmitted from the array of near-red LEDs 714 to a series of resistors 720, 742, 738, such as a 68 ohm resistor, with each resistor 720, 742 and 738 connected to a ground 744.

As further shown in FIG. 7, the far-red SSR 704 sends a photon emission signal 136 to initiate a photon pulse of far-red LEDs comprising a far-red voltage 710 to an array of red LEDs 718. The red voltage 710 is then transmitted from the red LED array 718 and a series of resistors 724, 728, 732 and 734, such as 390 ohm resistor with each resistor 724, 728, 732 and 734 connected to a ground 744. FIG. 7 also shows the blue SSR 706 sending a photon emission signal 136 to initiate a photon pulse of blue LEDs comprising a blue voltage 712 to an array of blue LEDs 716. The blue voltage 712 is then transmitted from the array of blue LEDs 716 and transmitted to a series of resistors 722, 726, 730, 736 and 740, such as a 150 ohm resistor, with each resistor 722, 726, 730, 736 and 740 connected to a ground 744.

The system of the present disclosure may be successfully employed with a wide variety of birds, chickens, ducks and other water fowl, turkeys, emu, ostrich, quail, pheasant, upland game birds, pigeon, parrots and other exotic bird species.

Figure 10:
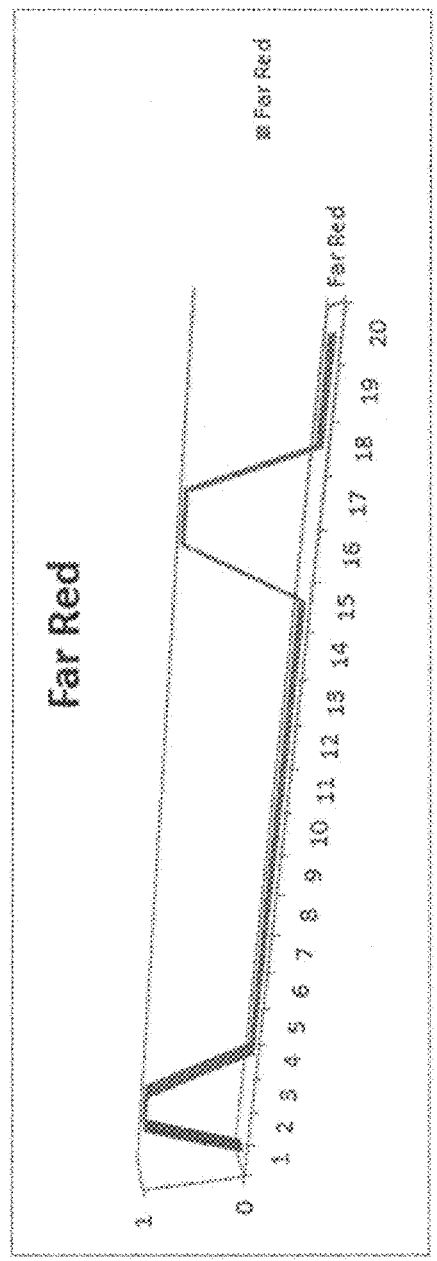
FIG. 10 is a graph showing an example the duration of a far-red photon pulse versus the duration of the delay between photon pulses for the controlled stimulation of ovulation and egg laying in birds.

FIG. 10 is a graph showing an example the duration of a far-red photon pulse versus the duration of the delay between photon pulses for the controlled stimulation of ovulation and egg laying in birds. As shown in FIG. 10 and previously described in FIGS. 1-7, an example of the cycling of photon pulses of one color spectrum is provided where a far-red photon pulse is emitted from a photon emitter. As shown in the graph a far-red spectrum is pulsed first followed by a delay. Next, a second pulse comprising of far-red spectrum is again pulsed followed by a delay. This cycle may be repeated indefinitely or until the bird ovulation and egg production under and receiving the photon pulses has reached its desired production amount. While in this descriptive example of a photon pulse set comprising offset pulsing of one color spectrum, it should be understood that this description is applicable to any such system with other emissions of photon pulses over a period of time, as various combinations of pulses of color spectrums including but not limited to near-red, far-red, infra-red, green blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 11:
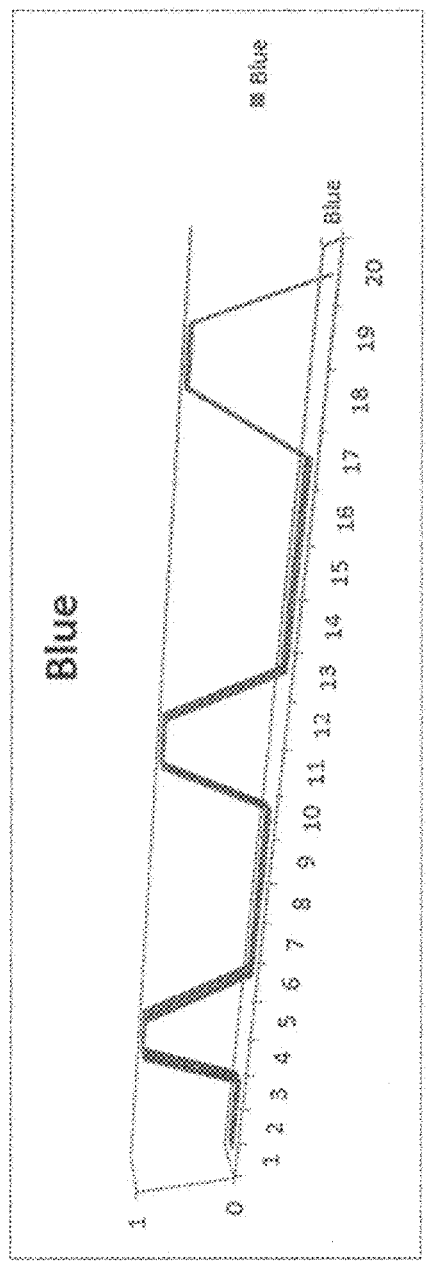
FIG. 11 is a graph showing an example the duration of a blue spectrum photon pulse versus the duration of the delay between photon pulses for the stimulation of a specific behavior such hunger or calming of the bird.

FIG. 11 is a graph showing an example the duration of a blue spectrum photon pulse versus the duration of the delay between photon pulses for the stimulation of a specific behavior such hunger or calming of the bird. As shown in FIG. 11 and previously described in FIGS. 1-7, an example of the cycling of photon pulses of one color spectrum is provided where a blue photon pulse is emitted from a photon emitter. As shown in the graph a blue spectrum is pulsed first followed by a delay. Next, a second pulse comprising of blue spectrum is again pulsed followed by a delay. This cycle may be repeated indefinitely or until the bird's mood is at the desired area or the bird has eaten a desired about of food. While in this descriptive example of a photon pulse set comprising offset pulsing of one color spectrum, it should be understood that this description is applicable to any such system with other emissions of photon pulses over a period of time, as various combinations of pulses of color spectrums including but not limited to near-red, far-red, infra-red, green blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 12:
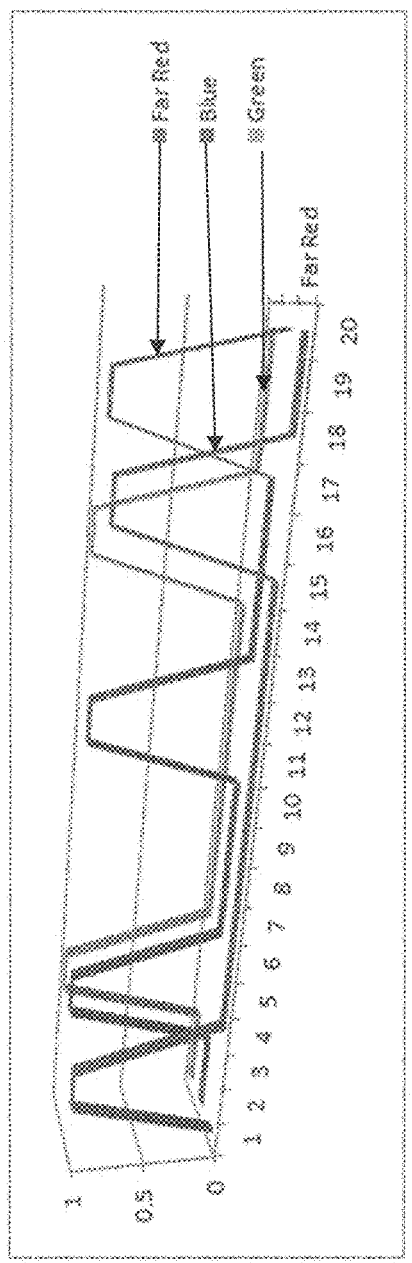
FIG. 12 is a graph showing an example of the duration of a photon pulse versus the duration of the delay between photon pulses of three color spectrums.

FIG. 12 is a graph showing an example of the duration of a photon pulse versus the duration of the delay between photon pulses of three color spectrums. The time scale on this chart is not to scale but serves as an example embodiment exhibiting the variation of color spectrum, frequency and duty cycle that may be utilized to stimulate ovulation, hunger and to reset the circadian rhythm of the bird. As shown in FIG. 12 and previously described in FIGS. 1-7, another example of the cycling of photon pulses of various color spectrum of the present disclosure is provided where photon pulses of three color spectrums are emitted from a photon emitter. As shown in the graph a far-red spectrum is pulsed first followed by a delay and then a dual pulse of a green spectrum and a blue spectrum together is then dosed followed by a delay creating a first set of photon pulses. Next, a second pulse of blue is initiated followed by a delay followed by individual pulses of far-red and green. This cycle may be repeated indefinitely or until the desired bird response has been initiated under and receiving the photon pulses. As discussed above, this example may also be used to stimulate ovulation, hunger, behavior or to reset the bird's circadian rhythm. While in this descriptive example of a photon pulse set comprising offset pulsing of three color spectrum, it should be understood that this description is applicable to any such system with other emissions of photon pulses over a period of time, as various combinations of pulses of color spectrums including but not limited to near-red, far-red, infra-red, green, blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 13:
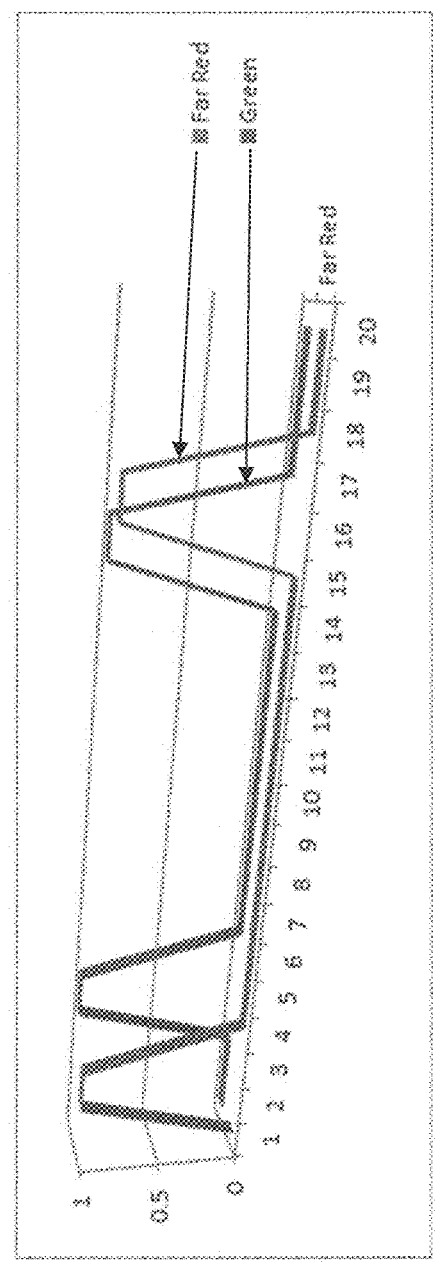
FIG. 13 is a graph showing an example of the duration of a photon pulse versus the duration of the delay between photon pulses of two color spectrums, far-red and green.

FIG. 13 is a graph showing an example of the duration of a photon pulse versus the duration of the delay between photon pulses of two color spectrums, far-red and green. The time scale on this chart is not to scale but serves as an example embodiment exhibiting the variation of color spectrum, frequency and duty cycle that may be utilized to stimulate ovulation and to reset the circadian rhythm of the bird. As shown in FIG. 13 and previously described in FIGS. 1-7, another example of the cycling of photon pulses of various color spectrum of the present disclosure is provided where photon pulses of two color spectrums are emitted from a photon emitter. As shown in the graph a far-red spectrum is pulsed first followed by a delay and then a pulse of a green spectrum and then followed by a delay. Next, a second pulse of green is initiated followed by a delay followed by an individual pulse of far-red. This cycle may be repeated indefinitely or until the desired bird response has been initiated under and receiving the photon pulses. As discussed above, this example may also be used to stimulate ovulation or to reset the bird's circadian rhythm. While in this descriptive example of a photon pulse set comprising offset pulsing of two color spectrum, it should be understood that this description is applicable to any such system with other emissions of photon pulses over a period of time, as various combinations of pulses of color spectrums including but not limited to near-red, far-red, infra-red, green, blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

FIG. 14 is a graph showing an example of the duration of a photon pulse versus the duration of the delay between photon pulses of two color spectrums, blue and green. The time scale on this chart is not to scale but serves as an example embodiment exhibiting the variation of color spectrum, frequency and duty cycle that may be utilized to stimulate hunger or a specific mood and to reset the circadian rhythm of the bird. As shown in FIG. 14 and previously described in FIGS. 1-7, another example of the cycling of photon pulses of various color spectrum of the present disclosure is provided where photon pulses of two color spectrums are emitted from a photon emitter. As shown in the graph pulses of blue and green are pulsed first followed by a delay. Next, a second pulse of blue is initiated followed by a delay followed by an individual pulse of green. This cycle may be repeated indefinitely or until the desired bird response has been initiated under and receiving the photon pulses. As discussed above, this example may also be used to stimulate hunger, mood or to reset the birds circadian rhythm. While in this descriptive example of a photon pulse set comprising offset pulsing of two color spectrum, it should be understood that this description is applicable to any such system with other emissions of photon pulses over a period of time, as various combinations of pulses of color spectrums including but not limited to near-red, far-red, infra-red, green, blue, yellow, orange and ultraviolet excluding the standard analog frequency lighting emission standards of the United States of 60 Hz and Europe of 50 Hz. Examples of the photon pulse duration between pulses of each individual color spectrum or color spectrum combinations may include but is not limited to, 0.01 microseconds to 5000 milliseconds and all integers in between. The system of the present disclosure also allows for other durations between pulses of each individual color spectrum or color spectrum combinations including but not limited to 0.1 microsecond to 24 hours, and all integers in between. The system of the present disclosure may be programmed to allow for variations of photon emission as well as variations of photon emission delay to allow for events such as extended dark cycles.

Figure 8:
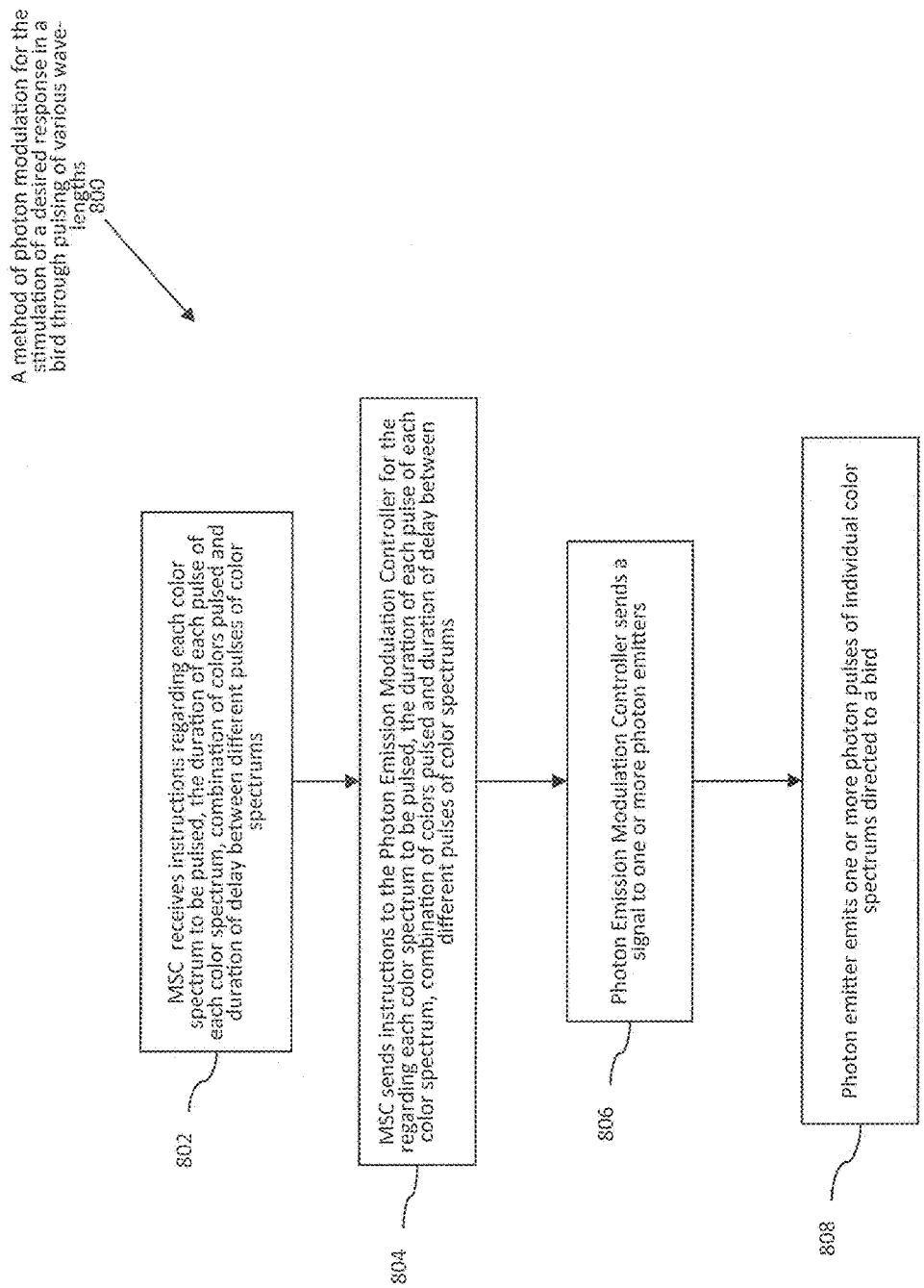
FIG. 8 is a flow diagram showing a method of photon modulation for the stimulation of a desired response in a bird through pulsing of various wavelengths.

FIG. 8 is a flow diagram showing the method of modulation of individual color spectrums pulsed for bird growth 800. As shown in FIG. 8, in step 802, the master logic controller receives instructions regarding each individual color spectrum to be pulsed, the duration of each pulse of each color spectrum, the combination of colors to be pulsed and duration of delay between each color spectrum pulse. Instructions and information sent to the master logic controller may relate to the photon pulse duration of each color to be pulsed, photon pulse delay, intensity, frequency, duty cycle, bird type, state of maturity of the bird and the type of egg production as well as young and broiler bird growth and behavior that is desired to be induced. In step 804, the master logic controller sends instructions to the photon emission modulation controller the regarding each color spectrum to be pulsed, the duration of each pulse of each color spectrum, combination of colors pulse and duration of delay between different color spectrums. In step 806, the photon emission modulation controller sends at least one signal to one or more photon emitters capable of emitting pulses of one or more individual color spectrums toward a bird, such as green LEDs, far-red LEDs, blue LEDs and orange LEDs. In step 808, one or more photon emitters emit one or more photon pulses of individual color spectrums directed to a bird.

Figure 9:
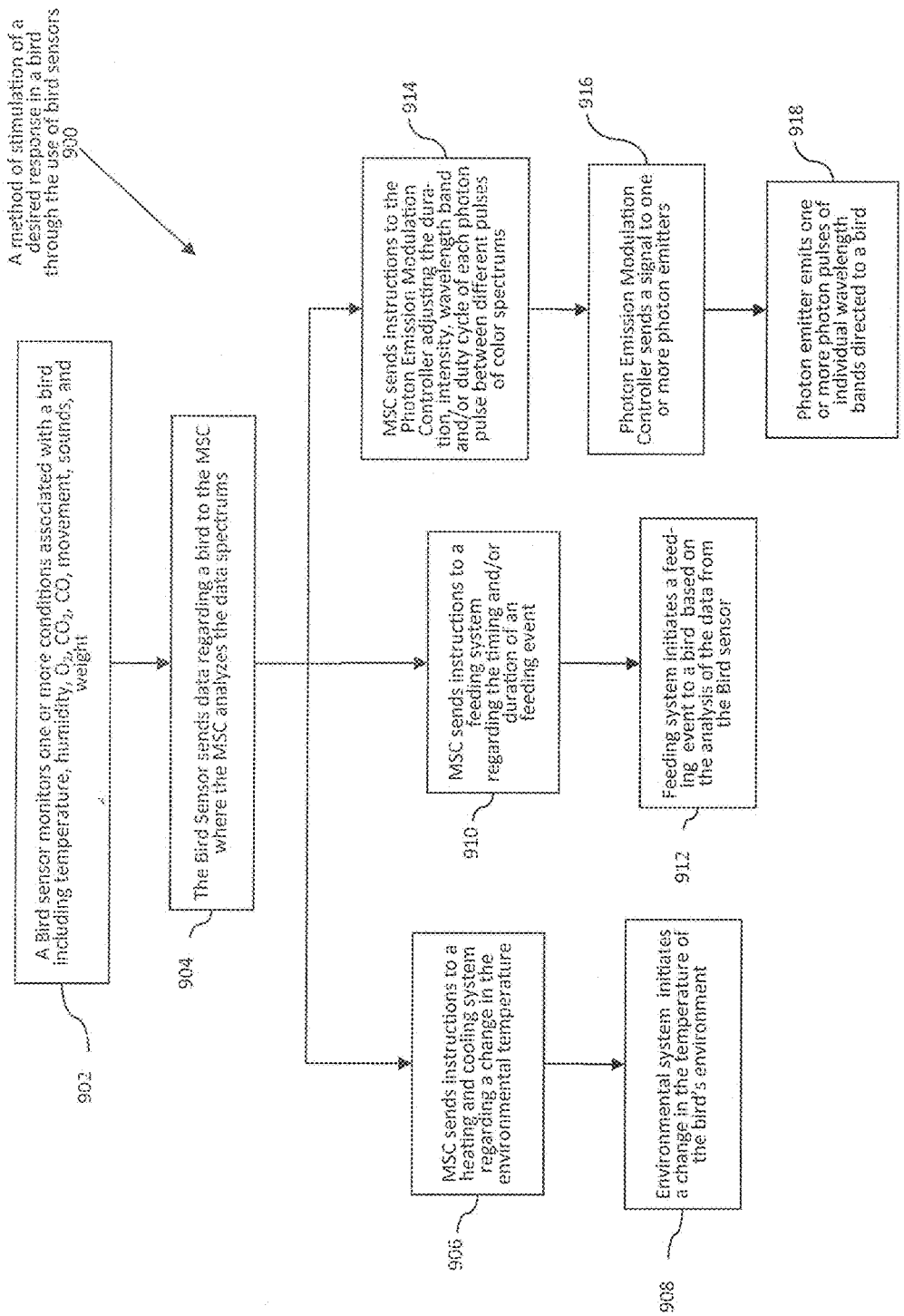
FIG. 9 is a flow diagram showing a method of stimulation of a desired response in a bird through the use of bird sensors.

FIG. 9 provides an additional embodiment of the present disclosure, showing a flowing diagram of the stimulation of a desired response of a bird based on information from bird sensors 900. As shown in step 902, a bird sensor monitors one or more conditions associated with the environment of a bird. The conditions to be monitored by include but is not limited to the air temperature, humidity, the birds body temperature, bird weight, sound, movement of the bird or birds, infrared, $O_2$, $CO_2$ and CO. In step 904, the bird sensor sends data regarding the environmental or physical conditions associated with a bird to the MLC. The MLC then analyzes the data sent from the bird sensor or the analysis may be done by a third party software program that is remote to the system. In step 906, based on the information from the bird sensor, the MLC sends instructions to change an embodiment of the bird's environment such as air temperature or humidity. In step 908, the environmental system initiates an event to one or more birds based on the analysis of the data from the bird sensor. As will be understood by one skilled in the art, the adjustment of the event can be on a micro level, such as an adjustment to the environment of one specific bird or the adjustment can be on a macro level such as an entire growth chamber or operation. In step 910, based on the information from the bird sensor the MLC sends instructions to a feeding system, nutrient system or nutrient source, such as a drip, nutrient film or nutrient injection system, regarding the timing and/or concentration of the nutrient to be distributed to a bird during a nutrient event. In step 912, nutrient system initiates a nutrient event where nutrients are directed to a bird based on the analysis of the data from the bird sensor. As will be understood by one skilled in the art, the adjustment of the nutrient event can be on a micro level, such as an adjustment to the nutrients to one specific bird or the adjustment can be on a macro level such as an entire growth chamber or operation. In step 914, based on the analysis of the data from the bird sensor, the MLC sends instructions to the photon emission modulation controller adjusting the duration, intensity, color spectrum and/or duty cycle of each photon pulse between different pulses of color spectrums to a specific bird or to a group of birds. In step 916, the photon emission modulation controller sends a signal to one or more photon emitters adjusting the duration, intensity, color spectrum and/or duty cycle of each photon pulse between different pulses of color spectrums to a specific bird or to a group of birds. In step 918, based on the signal received from the photon emission modulation controller, one or more photon emitters emit one or more photon pulses of individual color spectrums directed to a bird or a group of birds.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for inducing a desired response in a bird comprising:

at least one photon emitter in communication with at least one photon emission modulation controller;

wherein said at least one photon emitter is configured to emit at least one first photon pulse, wherein said at least one first photon pulse has a duration, intensity, wavelength band and duty cycle;

wherein said duration of said at least one first photon pulse is between 0.01 microseconds and 5000 milliseconds and wherein the duration of the delay between said photon pulses is between 0.1 microseconds and 24 hours;

wherein said duty cycle of said first photon pulse is between 0.01% and 90% of constant emission of said at least one photon emitter;

wherein said at least one photon emitter is configured to emit at least one additional photon pulse, wherein said at least one additional photon pulse has a duration, intensity, wavelength band and duty cycle, wherein said duration, intensity, wavelength band and duty cycle of said at least one additional photon pulse is different from the said duration, intensity, wavelength band and duty cycle of said at least one first photon pulse;

wherein said at least one photon emission modulation controller controls said emission of photons from said photon emitter;

wherein said duration of said at least one additional photon pulse is between 0.01 microseconds and 5000 milliseconds and wherein the duration of the delay between said photon pulses is between 0.1 microseconds and 24 hours;

wherein said duty cycle of said at least one additional photon pulse is between 0.01% and 90% of constant emission of said at least one photon emitter;

a master logic controller in communication with said at least one photon emission modulation controller, wherein said master logic controller sends commands to said at least one photon emission modulation controller controlling the duration, intensity, wavelength band and duty cycle of said at least one first photon pulse and said at least one additional photon pulse from said at least one photon emitter; and wherein said master logic controller is in communication with an environmental system; and wherein said at least one first photon pulse and said at least one additional photon pulse induce a desired response in a bird;

wherein said desired response from said bird is chosen from ovulation, fertility, egg production or laying, hunger, growth, reduction of stress or calming, improving egg quality, socialization, bird growth, bird development, sexual maturity, improving reproductive quality, facilitation of nutrient uptake, photochemical responses, and regulation of circadian rhythm.

2. The system of claim 1, wherein said at least one photon emitter is configured to emit a plurality of at least one first photon pulses, wherein said plurality of said at least one first photon pulses are of a duration, intensity, wavelength band and duty cycle; and wherein said at least one additional photon pulse is emitted after the emission of said plurality of said first photon pulses, wherein said at least one additional photon pulse has a duration, intensity, wavelength band and duty cycle that is different from the duration, intensity, wavelength band and duty cycle of said at least one first photon pulse.

3. The system of claim 2, wherein said at least one photon emitter is configured to emit at least one additional plurality of said at least one first photon pulses after the emission of said at least one additional photon pulse, wherein said plurality of said at least one first photon pulses are of a duration, intensity, wavelength band and duty cycle; and wherein at least one additional said at least one additional photon pulse is emitted after the emission of said at least one additional plurality of said first photon pulses, wherein said at least one additional photon pulse has a duration, intensity, wavelength band and duty cycle that is different from the duration, intensity, wavelength band and duty cycle of said at least one first photon pulse.

4. The system of claim 1, wherein said system comprises a plurality of photon emitters.

5. The system of claim 4, wherein said at least one photon emitter is selected from the group of incandescent (Tungsten-halogen and Xenon), Fluorescent (CFL's), high intensity discharge (Metal Halide, High-Pressure Sodium, Low-Pressure Sodium, Mercury Vapor), and light emitting diode.

6. The system of claim 1, wherein said master logic controller is in communication with a power consumption sensor that monitors the power usage of said at least one photon emitter and wherein said power consumption sensor is in communication with a host that is external to said master logic controller.

7. The system of claim 1, wherein said at least one photon emission modulation controller is selected from the group comprising a solid-state relay, a metal-oxide-semiconductor field-effect transistor, a field-effect transistor, a zener diode, an optical chopper and a device that induces modulation of a photon pulse.

8. The system of claim 1, wherein said wavelength band of said at least one first photon pulse is chosen from the group comprising near-red, far-red, green, blue, infra-red, yellow, orange, and ultra-violet.

9. The system of claim 1, wherein said wavelength band of said at least one additional photon pulse is chosen from the group comprising near-red, far-red, green, blue, infra-red, yellow, orange and ultra-violet.

10. The system of claim 1, wherein said wavelength band of said at least one first photon pulse is between 0.1 nm and 1 cm.

11. The system of claim 1, wherein said wavelength band of said at least one additional photon pulse has a wavelength between 0.1 nm and 1 cm.

12. The system of claim 1, further comprising
at least one sensor monitoring at least one condition associated with said bird, wherein said at least one condition associated with said bird is an environmental conditional associated with said bird or a physiological condition associated with said bird;
wherein said at least one sensor is operably linked to a first communication device, wherein said first communication device sends data from said at least one sensor to said master logic controller.

13. The system of claim 12, wherein said master logic controller adjusts said duration, intensity, wavelength band and duty cycle of said at least one first photon pulse and said duration, intensity, wavelength band and duty cycle from said at least one additional photon pulse based upon said data from said at least one sensor.

14. The system of claim 13, wherein said environmental system controls heating, cooling and humidity to said bird.

15. The system of claim 14, wherein said master logic controller adjusts the timing of an environmental event to said environmental system to said bird based upon said data from said at least one sensor, wherein said environmental event is chosen from a change in temperature and humidity.

16. The system of claim 14, wherein said master logic controller adjusts the duration of an environmental event to said bird based upon said data from said at least one sensor.

17. The system of claim 13, further comprising said master logic controller in communication with a nutrient source, wherein said nutrient source provides nutrient events to said bird.

18. The system of claim 17, wherein said master logic controller adjusts the timing of a nutrient event to said bird based upon said data from said at least one sensor.

19. The system of claim 17, wherein said master logic controller adjusts the duration of a nutrient event to said bird based upon said data from said at least one sensor.

20. The system of claim 12, wherein said at least one sensor is selected from the group comprising a temperature sensor, humidity sensor, movement sensor, weight sensor, sound sensor, a gas sensor, a near-infrared sensor, a camera, and combinations thereof.

21. The system of claim 1, wherein said bird is selected from the group comprising: chickens, ducks and other water fowl, turkeys, emu, ostrich, quail, pheasant, upland game birds, pigeon, parrots and other exotic bird species.

22. The system of claim 1, wherein said at least one first photon pulse has a change in light quantum of at least 5%.

23. The system of claim 1, wherein said at least one additional photon pulse has a change in light quantum of at least 5%.

24. The system of claim 1, wherein said duty cycle of said at least one first photon pulse ranges between 0.01% to 10%.

25. The system of claim 1, wherein said duty cycle of said at least one additional photon pulse ranges between 0.1% to 10%.

26. The system of claim 1, wherein said duty cycle of said at least one first photon pulse ranges between 10.01% to 15%.

27. The system of claim 1, wherein said duty cycle of said at least one additional photon pulse ranges between 10.1% to 15%.

28. The system of claim 1, wherein said duty cycle of said at least one first photon pulse ranges between 15.01% to 20%.

29. The system of claim 1, wherein said duty cycle of said at least one additional photon pulse ranges between 15.01% to 20%.

30. The system of claim 1, wherein said duty cycle of said at least one first photon pulse ranges between 20.01% to 30%.

31. The system of claim 1, wherein said duty cycle of said at least one additional photon pulse ranges between 20.1% to 30%.

32. The system of claim 1, wherein said duty cycle of said at least one first photon pulse ranges between 30.01% to 40%.

33. The system of claim 1, wherein said duty cycle of said at least one additional photon pulse ranges between 30.1% to 40%.

34. The system of claim 1, wherein said duty cycle of said at least one first photon pulse ranges between 40.01% to 90%.

35. The system of claim 1, wherein said duty cycle of said at least one additional photon pulse ranges between 40.01% to 90%.

36. The system of claim 1, wherein said duration, intensity, wavelength band and duty cycle of said first photon pulse and said duration, intensity, wavelength band and duty cycle of said at least one additional photon pulse induce a gain efficiency greater than 1.

37. A method for inducing a desired response in a bird wherein said method comprises:
providing at least one photon emitter;
providing at least one photon emission modulation controller in communication with said at least one photon emitter;
communicating a command from said at least one photon emission modulation controller to said at least one photon emitter;
emitting at least one first photon pulse from said at least one photon emitter toward said bird, wherein said at least one first photon pulse has a duration, intensity, wavelength band and duty cycle;
wherein said duration of said at least one first photon pulse is between 0.01 microseconds and 5000 milliseconds and wherein the duration of the delay between said photon pulses is between 0.1 microseconds and 24 hours;
wherein said duty cycle of said first photon pulse is between 0.01% and 90% of constant emission of said at least one photon emitter; and
emitting at least one additional photon pulse from said at least one photon emitter toward said bird, wherein said at least one additional photon pulse has a duration, intensity, wavelength band and duty cycle; wherein said duration, intensity, wavelength band and duty cycle of said at least one additional photon pulse is different from the said duration, intensity, wavelength band and duty cycle of said at least one first photon pulse;
wherein said duration of said at least one additional photon pulse is between 0.01 microseconds and 5000 milliseconds and wherein the duration of the delay between said photon pulses is between 0.1 microseconds and 24 hours;
wherein said duty cycle of said additional photon pulse is between 0.01% to 90% of constant emission of said at least one photon emitter;
providing a master logic controller in communication with said at least one photon emission modulation controller, wherein said master logic controller sends commands to said at least one photon emission modulation controller controlling the duration, intensity, wavelength band and duty cycle of said at least one first photon pulse and said at least one additional photon pulse from said at least one photon emitter; and
wherein said master logic controller is in communication with an environmental system;
and
wherein a desired response is induced in a bird;
wherein said desired response from said bird is chosen from ovulation, fertility, egg production or laying, hunger, growth, reduction of stress or calming, improving egg quality, socialization, bird growth, bird development, sexual maturity, improving reproductive quality, facilitation of nutrient uptake, photochemical responses, and regulation of circadian rhythm.

38. The method of claim 37, further comprising:
emitting at least one additional at least one first photon pulse from said at least one photon emitter toward said bird after the emission of said at least one additional photon pulse, wherein said at least one first photon pulse has a duration, intensity, wavelength band and duty cycle; and
emitting at least one additional said at least one additional photon pulse from said at least one photon emitter toward said bird, wherein said at least one additional photon pulse has a duration, intensity, wavelength band and duty cycle; wherein said duration, intensity, wavelength band and duty cycle of said at least one additional photon pulse is different from the said duration, intensity, wavelength band and duty cycle of said at least one first photon pulse.

39. The method of claim 37, further comprising:
emitting a plurality of said first photon pulses from said at least one photon emitters, wherein said plurality of said first photon pulses has a duration, intensity, wavelength band and duty cycle; and
emitting at least one additional photon pulse after the emission of said plurality of said first photon pulses, wherein said at least one additional photon pulse has a duration, intensity, wavelength band and duty cycle that is different from the duration, intensity, wavelength band and duty cycle of said plurality of said first photon pulses.

40. The method of claim 37, further comprising:
emitting at least one additional plurality of said first photon pulses from said at least one photon emitters after the emission of said at least one additional photon pulse, wherein said plurality of said first photon pulses has a duration, intensity, wavelength band and duty cycle; and
emitting at least one additional said at least one additional photon pulse after emitting said second plurality of said first photon pulses, wherein said at least one additional photon pulse has a duration, intensity, wavelength band and duty cycle that is different from the duration, intensity, wavelength band and duty cycle of said at least one first photon pulse.

41. The method of claim 37, wherein said at least one photon emitter is selected from the group consisting of incandescent (Tungsten-halogen and Xenon), Fluorescent (CFL's), high intensity discharge (Metal Halide, High-Pressure Sodium, Low-Pressure Sodium, Mercury Vapor), and light emitting diode.

42. The method claim 37, further comprising:
providing a power consumption sensor in communication with said master logic controller;
monitoring the power usage of said at least one photon emitter;
communicating said power consumption from said power consumption sensor to a host external to the master logic controller.

43. The method of claim 37, wherein said at least one photon emission modulation controller is selected from the group consisting of a solid-state relay, a metal-oxide-semiconductor field-effect transistor, a field-effect transistor, a zener diode, an optical chopper and a device that induces modulation of a photon pulse.

44. The method of claim 37, wherein said wavelength band of said at least one first photon pulse is chosen from the group consisting of near-red, far-red, green, blue, infra-red, yellow, orange, and ultra-violet.

45. The method of claim 37, wherein said wavelength band of said at least one additional photon pulse is chosen from the group consisting of near-red, far-red, green, blue, infra-red, yellow, orange and ultra-violet.

46. The method of claim 37, wherein said wavelength band of said at least one first photon pulse has a wavelength between 0.1 nm and 1 cm.

47. The method of claim 37, wherein said wavelength band of said at least one additional photon pulse has a wavelength between 0.1 nm and 1 cm.

48. The method of claim 37, wherein said duration, intensity, wavelength band and duty cycle of said at least one first photon pulse is the same as said duration, intensity, wavelength band and duty cycle of said at least one additional photon pulse.

49. The method of claim 37, further comprising
providing at least one sensor;
monitoring at least one condition associated with said bird, wherein said at least one condition associated with said bird is an environmental condition associated with said bird or a physiological condition associated with said bird; and
communicating data regarding said condition from said at least one sensor to said master logic controller.

50. The method of claim 49, further comprising
adjusting said duration, intensity, wavelength band and duty cycle of said at least one first photon pulse and said duration, intensity, wavelength band and duty cycle from said at least one additional photon pulse from said at least one photon emitter based upon said data from said at least one sensor.

51. The method of claim 49,
wherein said environmental system controls heating, cooling and humidity to said bird.

52. The method of claim 51, wherein said master logic controller adjusts the timing of an environmental event to said environmental system to said bird based upon said data from said at least one sensor, wherein said environmental event is chosen from a change in temperature and humidity.

53. The method of claim 51, wherein said master logic controller adjusts the duration of an environmental event to said bird based upon said data from said at least one sensor.

54. The method of claim 49, further comprising
providing a nutrient source in communication with said master logic controller, wherein said nutrient source provides nutrient events to said bird.

55. The method of claim 54, further comprising:
initiating a nutrient event from said nutrient source to said bird based upon said data from said at least one sensor.

56. The method of claim 55, wherein said master logic controller determines the timing of said nutrient event based upon said data from said at least one sensor.

57. The method of claim 55, wherein said master logic controller determines the amount of nutrients directed toward said bird during said nutrient event based upon said data from said at least one sensor.

58. The method of claim 49, wherein said at least one sensor is selected from the group consisting of a temperature sensor, humidity sensor, movement sensor, weight sensor, sound sensor, a gas sensor, a near-infrared sensor, a camera, and combinations thereof.

59. The method of claim 37, wherein said bird is selected from the group comprising: chickens, ducks and other water fowl, turkeys, emu, ostrich, quail, pheasant, upland game birds, pigeon, parrots and other exotic bird species.

60. The method of claim 37, wherein all external light is obstructed from said bird.

61. The method of claim 37, wherein said emission of said at least one first photon pulse and said emission of said at least one additional photon pulse is a supplemental source of photons.

62. The method of claim 37, wherein said at least one first photon pulse has a change in light quantum of at least 5%.

63. The method of claim 37, wherein said at least one additional photon pulse has a change in light quantum of at least 5%.

64. The method of claim 37, wherein said duty cycle of said at least one first photon pulse ranges between 0.01% to 10%.

65. The method of claim 37, wherein said duty cycle of said at least one additional photon pulse ranges between 0.1% to 10%.

66. The method of claim 37, wherein said duty cycle of said at least one first photon pulse ranges between 10.01% to 15%.

67. The method of claim 37, wherein said duty cycle of said at least one additional photon pulse ranges between 10.1% to 15%.

68. The method of claim 37, wherein said duty cycle of said at least one first photon pulse ranges between 15.01% to 20%.

69. The method of claim 37, wherein said duty cycle of said at least one additional photon pulse ranges between 15.01% to 20%.

70. The method of claim 37, wherein said duty cycle of said at least one first photon pulse ranges between 20.01% to 30%.

71. The method of claim 37, wherein said duty cycle of said at least one additional photon pulse ranges between 20.1% to 30%.

72. The method of claim 37, wherein said duty cycle of said at least one first photon pulse ranges between 30.01% to 40%.

73. The method of claim 37, wherein said duty cycle of said at least one additional photon pulse ranges between 30.1% to 40%.

74. The method of claim 37, wherein said duty cycle of said at least one first photon pulse ranges between 40.01% to 90%.

75. The method of claim 37, wherein said duty cycle of said at least one additional photon pulse ranges between 40.1% to 90%.

76. The method of claim 37, wherein said response is a non-naturally stimulated response.

77. The method of claim 37, wherein said duration, intensity, wavelength band and duty cycle of said at least one first photon pulse is specifically tuned to a desired response from said bird.

78. The method of claim 37, wherein said duration, intensity, wavelength band and duty cycle of said at least one additional photon pulse is specifically tuned to a desired response from said bird.

79. The method of claim 37, wherein said method has a power savings of at least 50%.

80. The method of claim 37, wherein said duration, intensity, wavelength band and duty cycle of said first photon pulse and said duration, intensity, wavelength band and duty cycle of said at least one additional photon pulse induce a gain efficiency greater than 1.

* * * * *